(12) United States Patent
Sakano et al.

(10) Patent No.: US 10,192,309 B2
(45) Date of Patent: Jan. 29, 2019

(54) CAMERA CALIBRATION DEVICE

(71) Applicant: Clarion Co., Ltd., Saitama-shi, Saitama (JP)

(72) Inventors: Morihiko Sakano, Tokyo (JP); Toshiyuki Aoki, Tokyo (JP); Tsukasa Okada, Saitama (JP); Keiji Sato, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 177 days.

(21) Appl. No.: 15/033,941

(22) PCT Filed: Nov. 18, 2014

(86) PCT No.: PCT/JP2014/080530
§ 371 (c)(1),
(2) Date: May 3, 2016

(87) PCT Pub. No.: WO2015/079980
PCT Pub. Date: Jun. 4, 2015

(65) Prior Publication Data
US 2016/0275683 A1    Sep. 22, 2016

(30) Foreign Application Priority Data
Nov. 29, 2013  (JP) .................................. 2013-247261

(51) Int. Cl.
*G06T 7/80* (2017.01)
*G06T 7/00* (2017.01)
(Continued)

(52) U.S. Cl.
CPC .............. *G06T 7/0018* (2013.01); *B60R 1/00* (2013.01); *G06T 7/80* (2017.01); *H04N 7/181* (2013.01);
(Continued)

(58) Field of Classification Search
CPC ................................ G06T 7/0018; G06T 7/80
See application file for complete search history.

(56) References Cited

U.S. PATENT DOCUMENTS

| | | |
|---|---|---|
| 2009/0299684 A1 | 12/2009 | Imanishi et al. |
| 2010/0194886 A1 | 8/2010 | Asari et al. |

(Continued)

FOREIGN PATENT DOCUMENTS

| | | |
|---|---|---|
| JP | 2009-100342 A | 5/2009 |
| JP | 2009-104323 A | 5/2009 |

(Continued)

OTHER PUBLICATIONS

International Search Report (PCT/ISA/210) issued in PCT Application No. PCT/JP2014/080530 dated Feb. 24, 2015, with English translation (four (4) pages).

(Continued)

*Primary Examiner* — Thai Q Tran
*Assistant Examiner* — Girumsew Wendmagegn
(74) *Attorney, Agent, or Firm* — Crowell & Moring LLP

(57) ABSTRACT

A camera calibration device that captures images of at least one marker with at least two cameras and calibrates installation states of the at least two cameras based upon the captured images by the at least two cameras, includes: an extracting unit that extracts a feature amount of the at least one marker based upon the captured images by the at least two cameras; a primary calibration unit that calculates a position of each of the at least two cameras in a marker coordinate system, based upon the feature amount; and a secondary calibration unit that preforms coordinate transformation of the position of each of the cameras in the marker coordinate system calculated by the primary calibration unit, into a position of each of the cameras in a vehicle coordinate system.

10 Claims, 17 Drawing Sheets

(51) Int. Cl.
*H04N 7/18* (2006.01)
*H04N 17/00* (2006.01)
*B60R 1/00* (2006.01)

(52) U.S. Cl.
CPC ............ *H04N 7/183* (2013.01); *H04N 17/002* (2013.01); *B60R 2300/105* (2013.01); *B60R 2300/303* (2013.01); *G06T 2207/30204* (2013.01); *G06T 2207/30252* (2013.01)

(56) References Cited

U.S. PATENT DOCUMENTS

| | | |
|---|---|---|
| 2011/0187816 A1 | 8/2011 | Shimizu |
| 2012/0002057 A1 | 1/2012 | Kakinami |
| 2013/0135474 A1* | 5/2013 | Sakano ............ G06K 9/00791 348/148 |
| 2014/0139674 A1* | 5/2014 | Aoki ................ H04N 7/18 348/148 |
| 2015/0254853 A1* | 9/2015 | Tanaka ............ B60R 1/00 348/148 |

FOREIGN PATENT DOCUMENTS

| | | |
|---|---|---|
| JP | 2009-288152 A | 12/2009 |
| JP | 2011-25840 A | 2/2011 |
| WO | WO 2010/052772 A1 | 5/2010 |

OTHER PUBLICATIONS

European Search Report issued in counterpart European Application No. 14865838.8 dated Mar. 28, 2018 (seven (7) pages).

\* cited by examiner

CAMERA CALIBRATION DEVICE

TECHNICAL FIELD

The present invention relates to a camera calibration device.

BACKGROUND ART

An overhead view displaying device is known in which the entire surroundings of a vehicle is photographed by a plurality of cameras and a captured image acquired from each camera is transformed into an overhead view image, and a composite image that is synthesized from a plurality of the overhead view images are displayed on a monitor, so that the driver or others can visually recognize conditions around the vehicle. In such an overhead view displaying device, it is necessary to precisely align the overhead view images with each other. Therefore, it is required to calibrate installation states of the cameras, e.g. installation positions and installation angles of the cameras with a high accuracy. In PTL1, a camera adjusting device is disclosed in which it is determined whether calibration markers that are arranged at predetermined points around the vehicle are correctly photographed or not, and if it is determined that they are not correctly photographed, states of incorrect calibration markers are output and also measures for correction are output and guided.

CITATION LIST

Patent Literature

PTL1: Japanese Laid-Open Patent Publication No. 2011-25840

SUMMARY OF INVENTION

Technical Problem

The present invention calibrates installation states of at least two cameras that photograph captured images for overhead view image synthesis, with a high accuracy.

Solution to Problem

According to the 1st aspect of the present invention, a camera calibration device that captures images of at least one marker with at least two cameras and calibrates installation states of the at least two cameras based upon the captured images by the at least two cameras, comprises: an extracting unit that extracts a feature amount of the at least one marker based upon the captured images by the at least two cameras; a primary calibration unit that calculates a position of each of the at least two cameras in a marker coordinate system, based upon the feature amount; and a secondary calibration unit that preforms coordinate transformation of the position of each of the cameras in the marker coordinate system calculated by the primary calibration unit, into a position of each of the cameras in a vehicle coordinate system.

Advantageous Effects of Invention

According to the present invention, because an overhead view image can be generated on the basis of at least two photographed images without physically adjusting installation states of at least two cameras that photograph the captured images for overhead view image synthesis, calibration can be performed with a high accuracy after shipment of a vehicle, in a garage of a dealer, in a parking area of an user, or in a field in a delivery destination where a large-scale vehicle is assembled, for example.

DESCRIPTION OF EMBODIMENTS

First Embodiment

Figure 1:
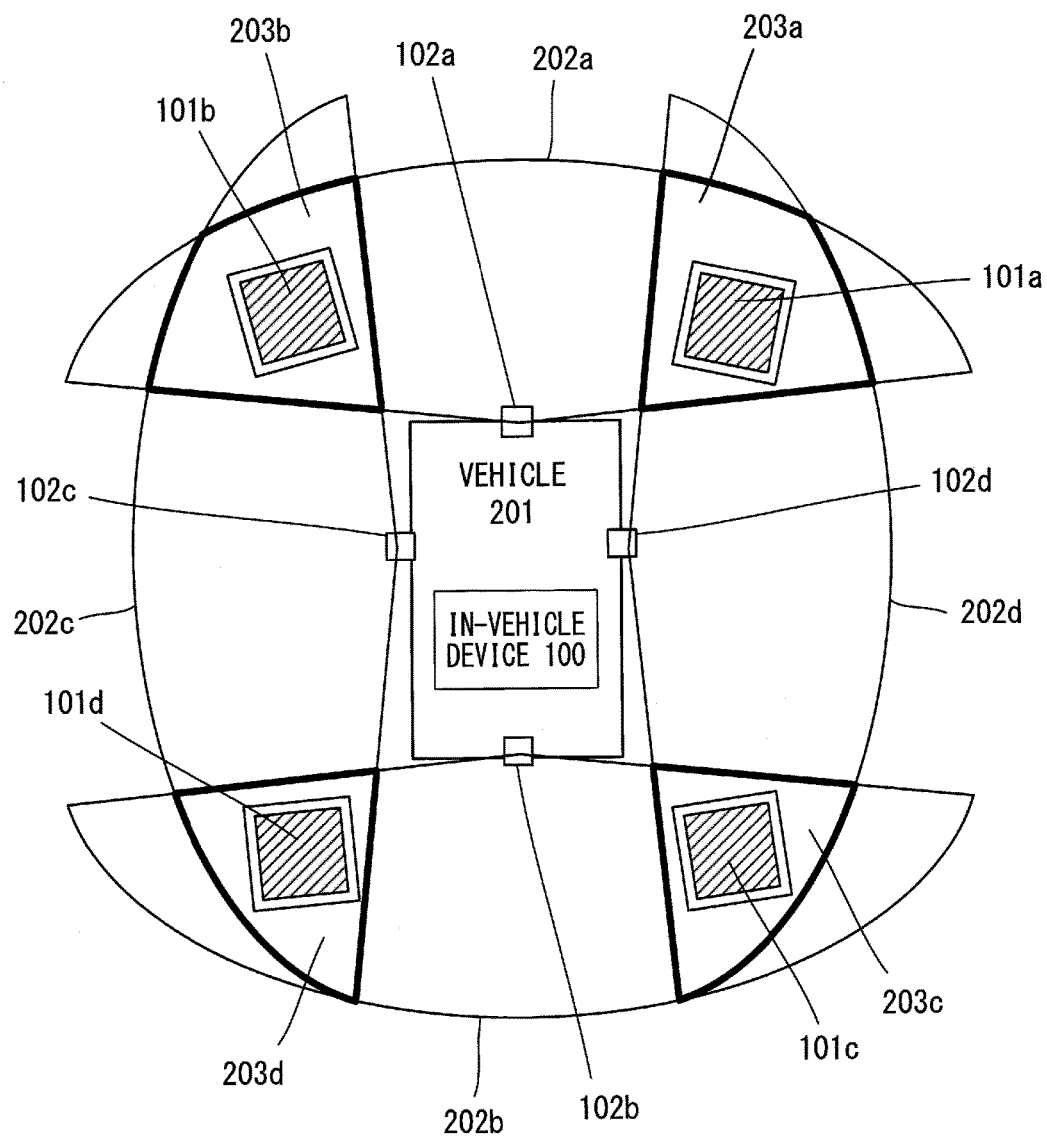
FIG. 1 A view showing one example of an environment in which calibration of cameras is performed using a camera calibration device according to the first embodiment of the present invention.

FIG. 1 is one example of an environment in which calibration of cameras is performed using a camera calibration device according to a first embodiment of the present invention. In FIG. 1, a vehicle 201 is a passenger vehicle and is parked in a garage of a car dealer or in a home parking area of an user, for example. The vehicle 201 is provided with cameras 102*a*, 102*b*, 102*c*, and 102*d*.

An in-vehicle device 100 is mounted on the vehicle 201 and connected to the cameras 102*a*-102*d*. The cameras 102*a*-102*d* comprise wide-angle cameras such as fish-eye cameras and are directed to the ground around the vehicle 201. The camera 102a is provided in a front part of the vehicle 201 and photographs an imaging range 202a in front of the vehicle 201 for each frame in order to output a captured image A1 to the in-vehicle device 100. The camera 102b is provided in a rear part of the vehicle 201 and photographs an imaging range 202b behind the vehicle 201 for each frame in order to output a captured image B1 to the in-vehicle device 100. The camera 102c is provided in a left part of the vehicle 201 and photographs an imaging range 202c on the left side of the vehicle 201 for each frame in order to output a captured image C1 to the in-vehicle device 100. The camera 102d is provided in a right part of the vehicle 201 and photographs an imaging range 202d on the right side of the vehicle 201 for each frame in order to output a captured image D1 to the in-vehicle device 100. The camera 102a is installed in the center of the front part of the vehicle and an optical axis of the camera 102a is directed in the forward direction of the vehicle, and the camera 102b is installed in the center of the rear part of the vehicle and an optical axis of the camera 102b is directed in the rearward direction of the vehicle. An optical axis of the camera 102c is directed to the left side of the vehicle and an optical axis of the camera 102d is directed to the right side of the vehicle, with regard to a forward and rearward direction of the vehicle.

Figure 2:
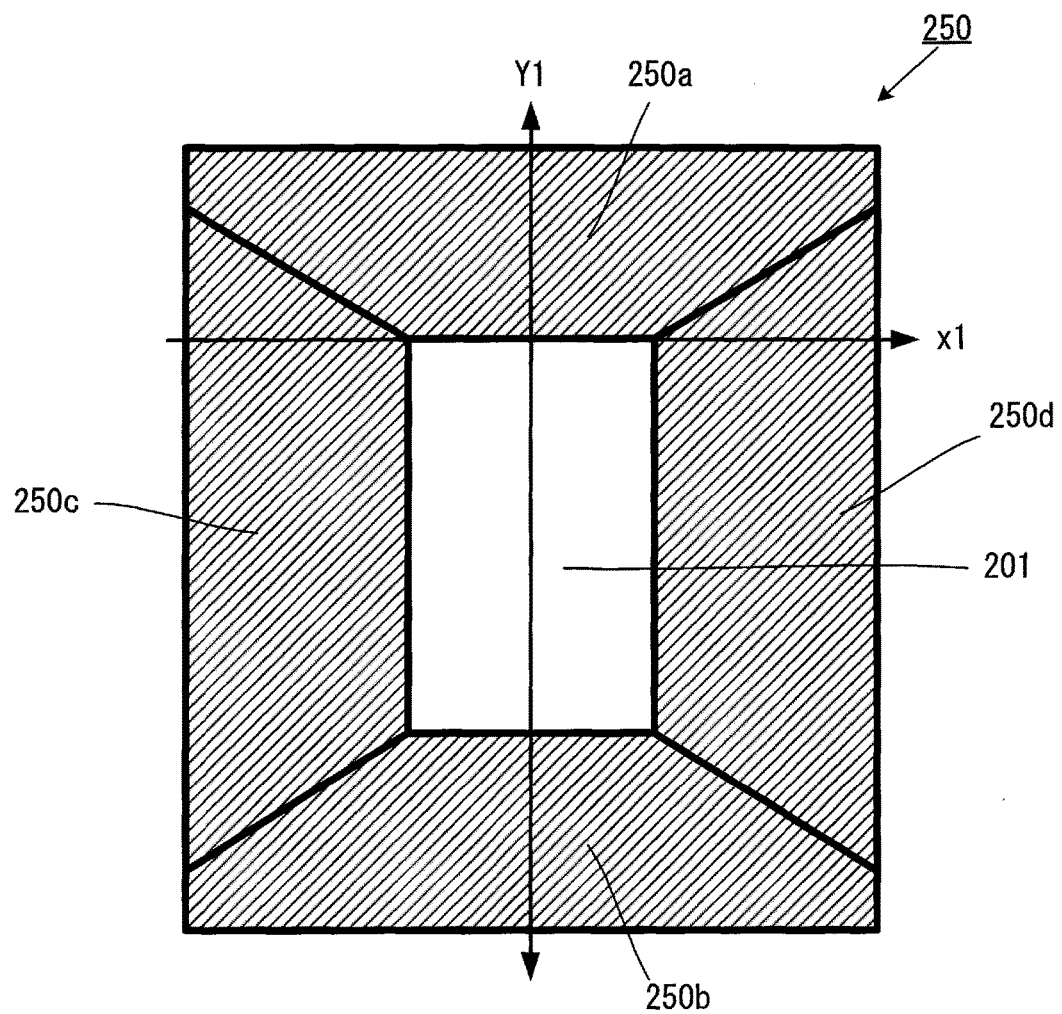
FIG. 2 A view showing one example of an overhead view image that is synthesized with a high accuracy owing to the calibration by the camera calibration device according to the first embodiment of the present invention.

The in-vehicle device 100 generates an overhead view image (top-view image or bird's-eye view image) 250 of the environment of the vehicle 201 as shown in FIG. 2 on the basis of the captured images A1-D1 of the cameras 102a-102d, and displays the overhead view image 250 on a display unit which is provided at a driver seat. Specifically, the overhead view image 250 shown in FIG. 2 has an image region 250a, an image region 250b, an image region 250c, and an image region 250d. The image in the image region 250a is generated on the basis of the captured image A1 which is output by the camera 102a. The image in the image region 250b is generated on the basis of the captured image B1 which is output by the camera 102b. The image in the image region 250c is generated on the basis of the captured image C1 which is output by the camera 102c. The image in the image region 250d is generated on the basis of the captured image D1 which is output by the camera 102d. It will be noted that axes X1 and Y1 in FIG. 2 forms a vehicle coordinate system and a coordinate origin thereof is located at a predetermined height position from the ground in the center of the front part of the vehicle. In design, a center position of the camera 102a is set at the coordinate origin. Although the height direction of the vehicle is represented by a coordinate value of an axis Z1, the illustration thereof is omitted in FIG. 2. An installation position of each camera 102a-102d is defined by a coordinate value (x, y, z) in the vehicle coordinate system and an installation angle thereof is defined by an angle (θroll, θpitch, θyaw). θroll is a roll angle of the optical axis of the camera, θpitch is a pitch angle of the optical axis of the camera, and θyaw is a yaw angle of the optical axis of the camera.

The in-vehicle device 100 provides a driver with information about the surrounding environment of the vehicle 201 by displaying the overhead view image 250 when the vehicle 201 is parked, for example. The in-vehicle device 100 calibrates installation states of the cameras 102a-102d, in order to correctly generate the overhead view image 250.

In FIG. 1, a serviceman installs predetermined calibration markers (indicators) 101a, 101b, 101c, and 101d on the ground on the right front side, on the left front side, on the right rear side, and on the left rear side of the vehicle 201, respectively, in order to calibrate the installation states of the cameras 102a-102d. The calibration markers 101a-101d are rectangular thin planer plates, each having a rectangular figure that is filled with solid black color on its surface, for example. It will be noted that the solid black fill of the rectangular figure is represented by hatching in FIG. 1.

The imaging range 202a and the imaging range 202d partially overlap each other on the right front side of the vehicle 201 and a range where they overlap each other will be referred to as a common imaging range 203a. The imaging range 202a and the imaging range 202c partially overlap each other on the left front side of the vehicle 201 and a range where they overlap each other will be referred to as a common imaging range 203b. The imaging range 202b and the imaging range 202d partially overlap each other on the right rear side of the vehicle 201 and a range where they overlap each other will be referred to as a common imaging range 203c. The imaging range 202b and the imaging range 202c partially overlap each other on the left rear side of the vehicle 201 and a range where they overlap each other will be referred to as a common imaging range 203d. In FIG. 1, each of the common imaging ranges 203a-203d is shown by a thick line.

In order to correctly calibrate the installation states of the cameras 102a-102d, i.e. the installation positions and the installation angles of the cameras 102a-102d, it is necessary to install the calibration markers 101a, 101b, 101c, and 101d within the common imaging ranges 203a, 203b, 203c, and 203d, respectively, as shown in FIG. 1.

The positions of the common imaging ranges 203a-203d vary depending on the installation states of the cameras 102a-102d. A calibration manual describes rough ranges indicating rough positions of the common imaging ranges 203a-203d with reference to the vehicle 201. The serviceman installs the calibration markers 101a-101d within the rough ranges, in accordance with the calibration manual. The rough ranges have been previously stored also in the in-vehicle device 100. It will be noted that the calibration markers 101a-101d are installed in any orientation as long as their surface having the rectangular figure is directed upwardly in a vertical direction (in a direction perpendicular to the paper surface).

The lengths L of four sides of the rectangular figures of the calibration markers 101a-101d are described in the calibration manual and thus they are known data that is available to the serviceman. Hereinafter, four corners of the rectangular figures will be referred to as feature points.

Figure 3:
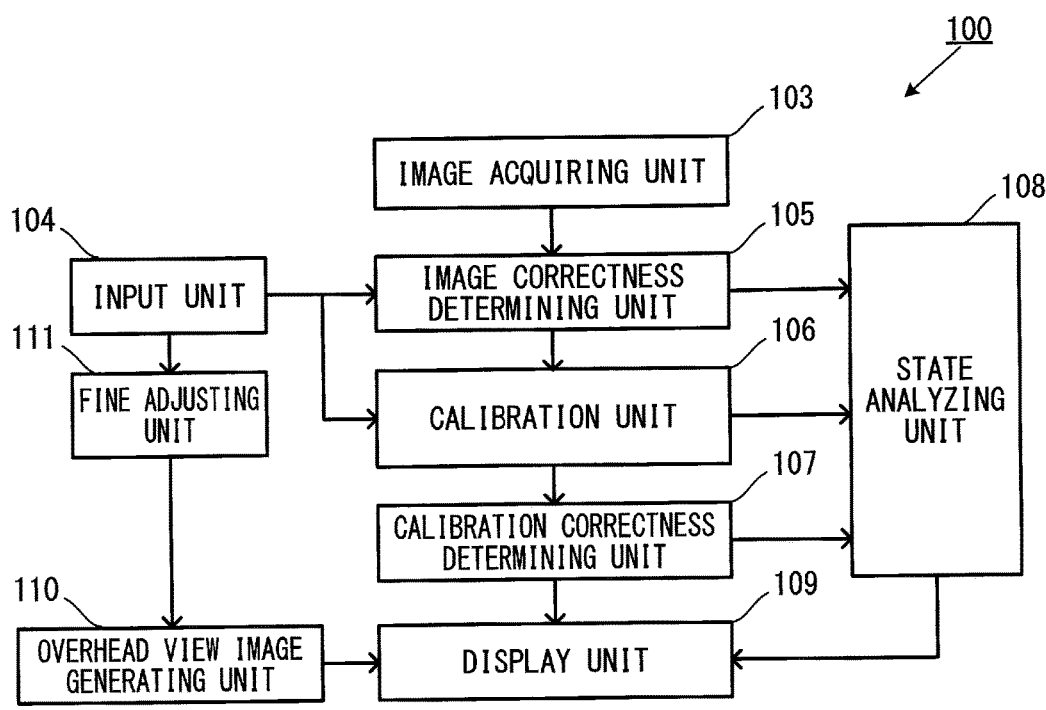
FIG. 3 A block view showing one configuration example of the camera calibration device according to the first embodiment of the present invention.

FIG. 3 is a block configuration diagram of the in-vehicle device 100 which is the camera calibration device according to the first embodiment of the present invention. The in-vehicle device 100 includes an image acquiring unit 103, an input unit 104, an image correctness determining unit 105, a calibration unit 106, a calibration correctness determining unit 107, a state analyzing unit 108, a display unit 109, an overhead view image generating unit 110, and a fine adjustment unit 111.

The image acquiring unit 103 acquires the captured images A1, B1, C1, and D1 from the cameras 102a-102d, respectively, and stores the captured images A1-D1 in a memory (not shown).

The input unit 104 is an input device such as a mouse, a keyboard, or a touch panel, for example. The serviceman inputs parameters required for calibration of the cameras 102a-102d through the input unit 104 in accordance with the calibration manual and performs an operation for starting the calibration. The parameters required for the calibration of the cameras 102a-102d are, for example, the lengths L of four sides of the rectangular figures of the calibration markers 101a-101d, characteristics of camera lenses of the cameras 102a-102d, and so on. Information according to the input operation is input to the image correctness determining unit 105, the calibration unit 106, and the fine adjustment unit 111.

The image correctness determining unit 105 determines whether the captured images A1-D1 acquired by the image acquiring unit 103 are correct or not. The image correctness determining unit 105 corrects distortions in the captured images A1-D1 that are caused by the characteristics of the camera lenses of the cameras 102a-102d, in order to generate corrected images A2-D2 (described below). Then, the image correctness determining unit 105 detects the feature points of the calibration markers 101a-101d on the basis of the corrected images A2-D2 and calculates coordinates of the feature points of the captured images A1-D1. Hereinafter, the coordinates of the feature points in the corrected images A2-D2 will be referred to as feature point coordinates. The image correctness determining unit 105 determines whether the images are correct or not, on the basis of whether the feature point coordinates are within the above described rough ranges or not.

The calibration unit 106 calculates the installation positions and the installation angles of the cameras 102a-102d in the vehicle coordinate system of overhead view image 250, on the basis of the feature point coordinates of the calibration markers 101a-101d which are calculated by the image correctness determining unit 105. Then, the calibration unit 106 adjusts set points of the installation positions and the installation angles so that the overhead view image 250 is correctly generated by the overhead view image generating unit 110.

The calibration correctness determining unit 107 determines whether the result of the calibration by the calibration unit 106 is correct or not, by means of the method described below. The result of the determination by the calibration correctness determining unit 107 is output to the state analyzing unit 108. The calibration correctness determining unit 107 also causes the display unit 109 to display the determination result.

The state analyzing unit 108 analyzes causes of failure of the calibration of the installation states of the cameras 102a-102d on the basis of outputs of the image correctness determining unit 105, the calibration unit 106, and the calibration correctness determining unit 107. The state analyzing unit 108 outputs measures of solving the causes that is found as a result of the analysis on the display unit 109 in order to instruct the serviceman to take the measures.

The overhead view image generating unit 110 generates the overhead view image 250 on the basis of the corrected images A2-D2. A mapping table, in which correspondences between pixels of the corrected images A2-D2 and pixels of the overhead view image 250 are stored, has been stored in the in-vehicle device 100. The overhead view image generating unit 110 performs coordinate transformation of the corrected images A2-D2 into the overhead view image 250, with reference to the mapping table. The mapping table is adjusted by the calibration unit 106 on the basis of the installation positions and the installation angles of the cameras 102a-102d after the calibration.

The fine adjustment unit 111 displays, on the display unit 109, the overhead view image and an adjustment screen for adjustment of the installation positions and the installation angles of the cameras, in order to cause the serviceman to finely adjust the installation positions and the installation angles of the cameras. The fine adjustment unit 111 adjusts the installation positions and the installation angles of the cameras 102a-102d, in accordance with the input operation by the serviceman through the input unit 104.

Once the serviceman has installed the calibration markers 101a-101d and has instructed the start of the calibration of the in-vehicle device 100 by the use of the input unit 104, an input screen for input of the parameters required for the calibration of the cameras 102a-102d is displayed on the display unit 109. Once the serviceman has completed the input of the parameters, acquirement of the captured images A1-D1 by the image acquiring unit 103 is started. In response to the start of the acquirement of the captured images A1-D1, also the image correctness determining unit 105 activates and determines whether the captured images A1-D1 are correct or not. If it is determined that the captured images A1-D1 are correct, the calibration unit 106 activates to calculate the installation positions and the installation angles of the cameras 102a-102d. The calibration correctness determining unit 107 determines whether the calibration by the calibration unit 106 is correct or not.

If it is determined by the image correctness determining unit 105 that the captured images are incorrect, or if it is determined by the calibration correctness determining unit 107 that the calibration is incorrect, the state analyzing unit 108 analyzes a cause of the failure of the calibration of the installation states of the cameras 102a-102d. For example, the state analyzing unit 108 analyzes that the installation positions of the calibration markers 101a-101d are out of the common imaging ranges 203a-203d, for example, as the cause. The state analyzing unit 108 displays measures according to the analysis result on the display unit 109. The serviceman takes the measures displayed on the display unit 109 and attempts the calibration of the cameras 102a-102d once again.

(Image Correctness Determining Unit 105)

Figure 4:
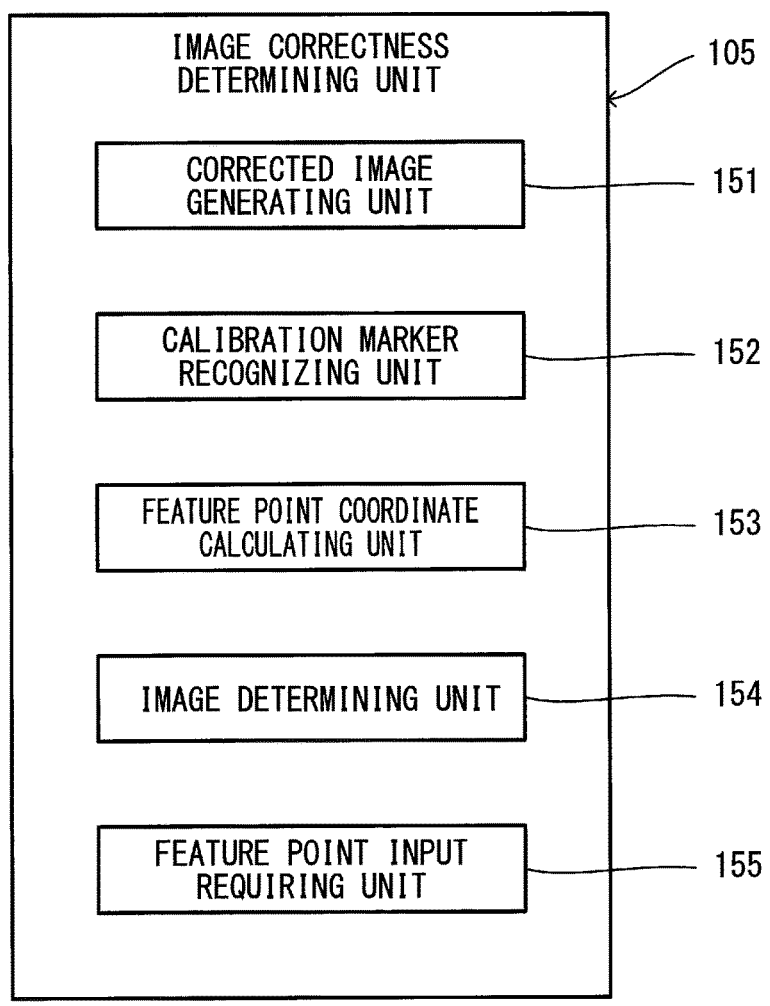
FIG. 4 A block view showing one configuration example of an image correctness determining unit.

As shown in FIG. 4, the image correctness determining unit 105 includes a corrected image generating unit 151, a calibration marker recognizing unit 152, a feature point coordinate calculating unit 153, an image determining unit 154, and a feature point input requiring unit 155.

The corrected image generating unit 151 corrects distortions in the captured images A1-D1 that are caused by the characteristics of the camera lenses of the cameras 102a-102d, in order to generate corrected images A2-D2. Information about the distortion caused by the characteristics of the camera lenses of the cameras 102a-102d has previously been set. The lenses of the cameras 102a-102d are lenses having a short focal length such as fish-eye lenses, and the captured images are thus distorted. It is therefore necessary to correct the distortion in order to display the images as overhead view images on a display monitor. For this reason, the corrected image generating unit 151 performs distortion correction, using the mapping table described above.

Figure 5:
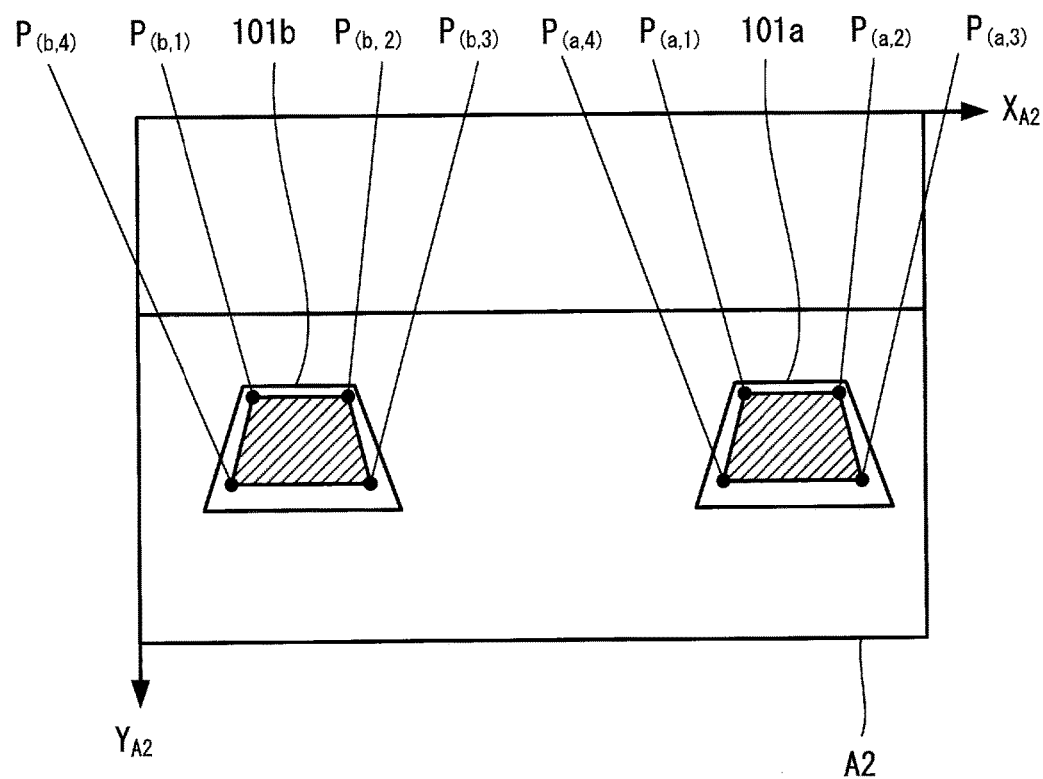
FIG. 5 A view showing one example of a corrected image.

FIG. 5 is a view showing one example of the corrected image A2. The corrected image A2 includes images of the calibration markers 101a and 101b that are located within the imaging range 202a as shown in FIG. 1. Furthermore, the corrected image A2 is formed from a plurality of pixels and these pixels are represented by a corrected image coordinate system having axes $X_{A2}$ and $Y_{A2}$, which is an orthogonal coordinate system.

The calibration marker recognizing unit 152 applies well-known image recognizing measures such as template matching or SIFT (Scale-Invariant Feature Transform) in order to detect the calibration markers 101a-101d on the basis of the corrected images A2-D2. In the example of FIG. 5, the calibration marker recognizing unit 152 detects the calibration marker 101a and the calibration marker 101b on the basis of the corrected image A2. Specifically, the calibration marker recognizing unit 152 detects the calibration markers 101a-101d in the following way. Thus, the calibration marker 101a is detected on the basis of the corrected image A2 and the corrected image D2, respectively. The calibration marker 101b is detected on the basis of the corrected image A2 and the corrected image C2, respectively. The calibration marker 101c is detected on the basis of the corrected image B2 and the corrected image D2, respectively. The calibration marker 101d is detected on the basis of the corrected image B2 and the corrected image C2, respectively.

The feature point coordinate calculating unit 153 calculates the feature points of the detected calibration markers 101a-101d as coordinate values on the corrected image coordinate system. In other words, the feature point coordinate calculating unit 153 calculates the feature point coordinates of the calibration markers 101a-101d. In the example of FIG. 5, a coordinate on the corrected image coordinate system of a feature point $P_{(a, i)}$ (wherein i is a serial number for four corners and an integer of 1 to 4) of the calibration markers 101a, and a coordinate on the corrected image coordinate system of a feature point $P_{(b, i)}$ of the calibration marker 101b, i.e. feature point coordinates are calculated.

Each of the feature point coordinates of the calibration markers 101a-101d is calculated from two corrected images in which the respective calibration marker 101a-101d is detected, respectively. In other words, the feature point coordinate of the calibration marker 101a is calculated on the corrected image coordinate system of the corrected image A2 and on the corrected image coordinate system of the corrected image D2, respectively. Similarly, the feature point coordinate of the calibration marker 101b is calculated on the corrected image coordinate system of the corrected image A2 and on the corrected image coordinate system of the corrected image C2, respectively. The feature point coordinate of the calibration marker 101c is calculated on the corrected image coordinate system of the corrected image B2 and on the corrected image coordinate system of the corrected image D2, respectively. The feature point coordinate of the calibration marker 101d is calculated on the corrected image coordinate system of the corrected image B2 and on the corrected image coordinate system of the corrected image C2, respectively.

The image determining unit 154 determines whether all of the feature point coordinates of the calibration markers 101a-101d are located within the above described rough ranges or not. If the image correctness determining unit 105 determines that all of the feature point coordinates of the calibration markers 101a-101d are located within the rough ranges, the image correctness determining unit 105 determines that the captured images A1-D1 are correct. On the other hand, if any one of the feature point coordinates of the calibration markers 101a-101d are out of the rough ranges, for example, the image correctness determining unit 105 determines that the captured images A1-D1 are incorrect.

If it is determined by the image determining unit 154 that the captured images A1-D1 are correct, the image correctness determining unit 105 outputs the feature point coordinates of the calibration markers 101a-101d to the calibration unit 106 and the state analyzing unit 108.

If it is determined by the image determining unit 154 that the captured images A1-D1 are incorrect, the image correctness determining unit 105 outputs information about the feature point coordinates of the calibration markers 101a-101d and information about calibration markers whose feature point coordinates were not detected, to the state analyzing unit 108.

If clipped whites are generated because of too bright captured images A1-D1, there is a risk that the calibration marker recognizing unit 152 cannot recognize the calibration markers 101a-101d. Also if clipped blacks are generated because of too dark captured images A1-D1, there is the risk that the calibration marker recognizing unit 152 cannot recognize the calibration markers 101a-101d. If the calibration marker recognizing unit 152 cannot recognize the calibration markers 101a-101d, the feature point input requiring unit 155 causes the serviceman to specify positions of the feature points. For example, the feature point input requiring unit 155 displays the corrected images in which the calibration markers 101a-101d cannot be recognized, on the display unit 109 and accepts input of the feature points through the input unit 104. The feature point input requiring unit 155 calculates the feature point coordinates for the feature points specified by the serviceman.

(Calibration Unit 106)

Figure 6:
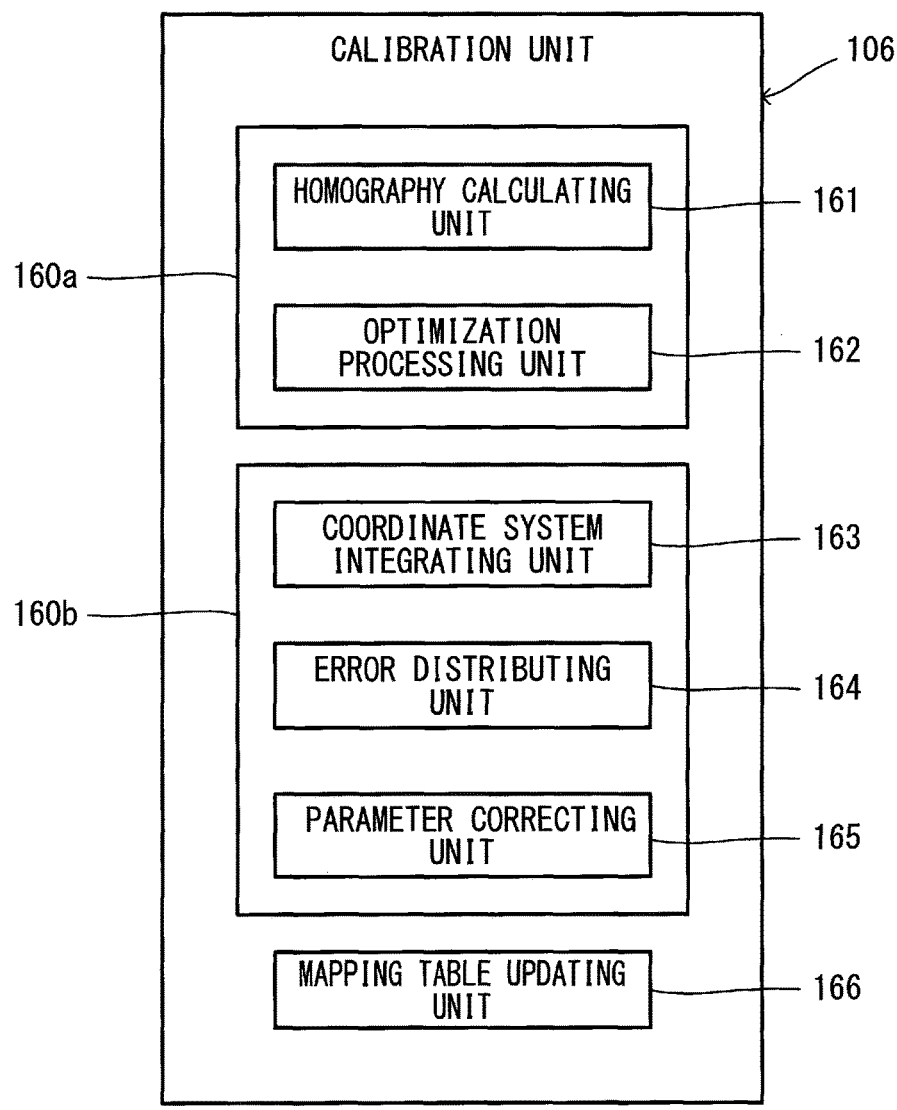
FIG. 6 A view showing one configuration example of a calibration unit.

FIG. 6 is a block configuration diagram of the calibration unit 106. The calibration unit 106 shown in FIG. 6 includes a primary calibration unit 160a, a secondary calibration unit 160b, and a mapping table updating unit 166. The primary calibration unit 160a calculates positions of the cameras 102a-102d in a coordinate system (referred to as a marker coordinate system), respectively, on the basis of the feature point coordinates of the calibration markers 101a-101d in the corrected image coordinate system. The secondary calibration unit 160b performs coordinate transformation of the position of each camera in the marker coordinate system, which is calculated by the primary calibration unit 160a, into the position of each camera in the vehicle coordinate system. The primary calibration unit 160a includes a homography matrix calculating unit 161 and an optimization processing unit 162. The secondary calibration unit 160b includes a coordinate system integrating unit 163, an error distributing unit 164, and a parameter correcting unit 165.

Figure 7:
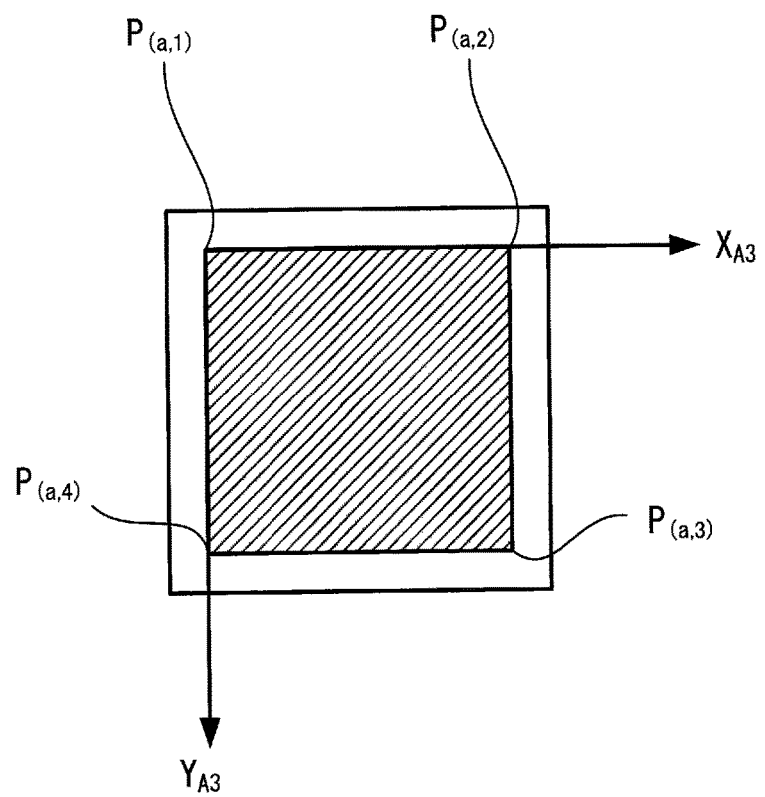
FIG. 7 A view showing one example of a marker coordinate system.

The marker coordinate system is a coordinate system that is provided for each calibration marker 101a-101d, having an origin at a predetermined position of the surface of the respective calibration marker 101a-101d and having two axes that are parallel to the surface of the respective calibration marker 101a-101d and orthogonal to each other, as shown in FIG. 7. The marker coordinate system shown in FIG. 7 is a coordinate system provided on the surface of the calibration marker 101a in which the feature point $P_{(a, 1)}$ is set as an origin and axes $X_{A3}$ and $Y_{A3}$ are set to be orthogonal to each other.

The homography matrix calculating unit 161 calculates homography matrices for coordinate transformation of the feature point coordinates of the calibration markers 101a-101d in the corrected image coordinate system into the coordinate system referred to as the marker coordinate system.

The homography matrix is individually calculated for each corrected image A2-D2 and individually calculated for each calibration marker 101a-101d. In other words, the calibration unit 106 calculates the following eight homography matrices:

(1. 1) a homography matrix $H_{(A2, a)}$ for coordinate transformation of the feature point coordinate of the calibration marker 101a in the corrected image coordinate system of the corrected image A2 into a coordinate in the marker coordinate system of the calibration marker 101a;

(1. 2) a homography matrix $H_{(A2, b)}$ for coordinate transformation of the feature point coordinate of the calibration marker 101b in the corrected image coordinate system of the corrected image A2 into a coordinate in the marker coordinate system of the calibration marker 101b;

(1. 3) a homography matrix $H_{(B2, c)}$ for coordinate transformation of the feature point coordinate of the calibration marker 101c in the corrected image coordinate system of the corrected image B2 into a coordinate in the marker coordinate system of the calibration marker 101c;

(1. 4) a homography matrix $H_{(B2, d)}$ for coordinate transformation of the feature point coordinate of the calibration marker 101d in the corrected image coordinate system of the corrected image B2 into a coordinate in the marker coordinate system of the calibration marker 101d;

(1. 5) a homography matrix $H_{(C2, b)}$ for coordinate transformation of the feature point coordinate of the calibration marker 101b in the corrected image coordinate system of the corrected image C2 into a coordinate in the marker coordinate system of the calibration marker 101b;

(1. 6) a homography matrix $H_{(C2, d)}$ for coordinate transformation of the feature point coordinate of the calibration marker 101d in the corrected image coordinate system of the corrected image C2 into a coordinate in the marker coordinate system of the calibration marker 101d;

(1. 7) a homography matrix $H_{(D2, a)}$ for coordinate transformation of the feature point coordinate of the calibration marker 101a in the corrected image coordinate system of the corrected image D2 into a coordinate in the marker coordinate system of the calibration marker 101a; and (1. 8) a homography matrix $H_{(D2, c)}$ for coordinate transformation of the feature point coordinate of the calibration marker 101c in the corrected image coordinate system of the corrected image D2 into a coordinate in the marker coordinate system of the calibration marker 101c A method of calculating the homography matrix $H_{(A2, a)}$ and a method of calculating the installation positions and the installation angles of the cameras in the marker coordinate system of the calibration marker 101a will be described.

An equation for coordinate transformation of a global coordinate system into the corrected image coordinate system of the corrected image A2 is represented by Equation (1). (u, v) represents a coordinate in the corrected image coordinate system of the corrected image A2, and (x, y, z) represents a coordinate in the global coordinate system. An origin of the global coordinate system coincides with an origin of the marker coordinate system. Coordinate axes of the global coordinate system include the axes $X_{A3}$ and $Y_{A3}$ of the marker coordinate system, and an axis $Z_{A3}$ that is orthogonal to these two axes. $R_{11}$, $R_{12}$, $R_{13}$, $R_{21}$, $R_{22}$, $R_{23}$, $R_{31}$, $R_{32}$, and $R_{33}$ are elements of a rotation matrix. A value of s is calculated at a later time.

$$s\begin{pmatrix} u \\ v \\ 1 \end{pmatrix} = \begin{pmatrix} R_{11} & R_{12} & R_{13} \\ R_{21} & R_{22} & R_{23} \\ R_{31} & R_{32} & R_{33} \end{pmatrix} \begin{pmatrix} x \\ y \\ z \end{pmatrix} + \begin{pmatrix} t_1 \\ t_2 \\ t_3 \end{pmatrix}$$ [Math. 1]

(Equation 1)

By transforming the sum of the matrix of Equation (1) into a product of the matrix, Equation (2) is obtained.

$$s\begin{pmatrix} u \\ v \\ 1 \end{pmatrix} = \begin{pmatrix} R_{11} & R_{12} & R_{13} & t_1 \\ R_{21} & R_{22} & R_{23} & t_2 \\ R_{31} & R_{32} & R_{33} & t_3 \end{pmatrix} \begin{pmatrix} x \\ y \\ z \\ 1 \end{pmatrix}$$ [Math. 2]

(Equation 2)

Because the calibration markers 110a-110d are installed on the ground (z=0), an equation for coordinate transformation of the marker coordinate system of the calibration marker 101a into the corrected image coordinate system of the corrected image A2 can be rewritten as Equation (3).

$$s\begin{pmatrix} u \\ v \\ 1 \end{pmatrix} = \begin{pmatrix} R_{11} & R_{12} & t_1 \\ R_{21} & R_{22} & t_2 \\ R_{31} & R_{32} & t_3 \end{pmatrix} \begin{pmatrix} x \\ y \\ 1 \end{pmatrix}$$ [Math. 3]

(Equation 3)

Here, an inverse matrix $H^{-1}_{(A2, a)}$ of the homography matrix $H_{(A2, a)}$ is defined as the following Equation (4). It will be noted that the inverse matrix $H^{-1}_{(A2, a)}$ is also a homography matrix.

$$H^{-1}_{(A2,a)} = \begin{pmatrix} R_{11} & R_{12} & t_1 \\ R_{21} & R_{22} & t_2 \\ R_{31} & R_{32} & t_3 \end{pmatrix}$$ [Math. 4]

(Equation 4)

By replacing elements of Equation (4) with $h_{11}$, $h_{12}$, $h_{13}$, $h_{21}$, $h_{22}$, $h_{23}$, $h_{31}$, $h_{32}$, and $h_{33}$, Equation (5) is obtained.

$$s\begin{pmatrix} u \\ v \\ 1 \end{pmatrix} = \begin{pmatrix} h_{11} & h_{12} & h_{13} \\ h_{21} & h_{22} & h_{23} \\ h_{31} & h_{32} & h_{33} \end{pmatrix} \begin{pmatrix} x \\ y \\ 1 \end{pmatrix}$$ [Math. 5]

(Equation 5)

Because of its homogeneous coordinate representation, the homography matrix may be optionally multiplied by a constant factor. It is here assumed that $h_{33}=1$, for example. Equation (5) in which $h_{33}$ is substituted by 1 is equivalent to the following simultaneous equations.

$$su = h_{11}x + h_{12}y + h_{13}$$

$$sv = h_{21}x + h_{22}y + h_{23}$$

$$s = h_{31}x + h_{32}y + 1$$

By deleting s from the simultaneous equations and rearranging the equations with respect to $h_{11}$, $h_{12}$, $h_{13}$, $h_{21}$, $h_{22}$, $h_{23}$, $h_{31}$, and $h_{32}$ to represent the equations in form of a matrix, Equation (6) is obtained.

$$\begin{pmatrix} x & y & 1 & 0 & 0 & 0 & -xu & -yu \\ 0 & 0 & 0 & x & y & 1 & -xv & -yv \end{pmatrix} \begin{pmatrix} h_{11} \\ h_{12} \\ h_{13} \\ h_{21} \\ h_{22} \\ h_{23} \\ h_{31} \\ h_{32} \end{pmatrix} = \begin{pmatrix} u \\ v \end{pmatrix} \quad \text{[Math. 6]}$$

(Equation 6)

The coordinates of the four feature points $P_{(a,1)}$, $P_{(a,2)}$, $P_{(a,3)}$, $P_{(a,4)}$ of the calibration marker 101$a$ in the corrected image coordinate system which are calculated by the image correctness determining unit 105 will be defined as $(u_1, v_1)$, $(u_2, v_2)$, $(u_3, v_3)$, $(u_4, v_4)$. The coordinates of the four feature points $P_{(a,1)}$, $P_{(a,2)}$, $P_{(a,3)}$, $P_{(a,4)}$ in the marker coordinate system which are calculated on the basis of the lengths L of four sides of the rectangular figures of the calibration markers 101$a$-101$d$ will be defined as $(x_1, y_1)$, $(x_2, y_2)$, $(x_3, y_3)$, $(x_4, y_4)$. Here, each of a relationship between $(u_1, v_1)$ and $(x_1, y_1)$, a relationship between $(u_2, v_2)$ and $(x, y_2)$, a relationship between $(u_3, v_3)$ and $(x_3, y_3)$, and a relationship between $(u_4, v_4)$ and $(x_4, y_4)$ is the same as the relationship in Equation (6). Therefore, elements $h_{11}$, $h_{12}$, $h_{13}$, $h_{21}$, $h_{22}$, $h_{23}$, $h_{31}$, and $h_{32}$ of the inverse matrix $H^{-1}_{(A2,a)}$ of the homography matrix $H_{(A2,a)}$ can be calculated by solving simultaneous equations represented by Equation (7).

$$\begin{pmatrix} x_1 & y_1 & 1 & 0 & 0 & 0 & -x_1u_1 & -y_1u_1 \\ 0 & 0 & 0 & x_1 & y_1 & 1 & -x_1v_1 & -y_1v_1 \\ x_2 & y_2 & 1 & 0 & 0 & 0 & -x_2u_2 & -y_2u_2 \\ 0 & 0 & 0 & x_2 & y_2 & 1 & -x_2v_2 & -y_2v_2 \\ x_3 & y_3 & 1 & 0 & 0 & 0 & -x_3u_3 & -y_3u_3 \\ 0 & 0 & 0 & x_3 & y_3 & 1 & -x_3v_3 & -y_3v_3 \\ x_4 & y_4 & 1 & 0 & 0 & 0 & -x_4u_4 & -y_4u_4 \\ 0 & 0 & 0 & x_4 & y_4 & 1 & -x_4v_4 & -y_4v_4 \end{pmatrix} \begin{pmatrix} h_{11} \\ h_{12} \\ h_{13} \\ h_{21} \\ h_{22} \\ h_{23} \\ h_{31} \\ h_{32} \end{pmatrix} = \begin{pmatrix} u_1 \\ v_1 \\ u_2 \\ v_2 \\ u_3 \\ v_3 \\ u_4 \\ v_4 \end{pmatrix} \quad \text{[Math. 7]}$$

(Equation 7)

The homography matrix calculating unit 161 calculates the homography matrix $H_{(A2,a)}$ on the basis of the inverse matrix $H^{-1}_{(A2,a)}$ of the homography matrix $H_{(A2,a)}$. The homography matrix calculating unit 161 also generates other seven homography matrices by means of the same calculation.

The homography matrix calculating unit 161 calculates Equations (8a), (8b), and (8c) on the basis of $h_{11}$, $h_{12}$, $h_{13}$, $h_{21}$, $h_{22}$ $h_{23}$, $h_{31}$, and $h_{32}$ in order to calculate the installation position $(t_1, t_2, t_3)$ of the camera 102$a$ in the marker coordinate system. It will be noted that s is calculated by the use of Equation (9).

$$t_1 = s \cdot h_{13} \quad \text{(Equation 8a)}$$

$$t_2 = s \cdot h_{23} \quad \text{(Equation 8b)}$$

$$t_3 = s \quad \text{(Equation 8c)}$$

$$S = \frac{1}{\sqrt{h_{11}^2 + h_{21}^2 + h_{31}^2}} \quad \text{[Math. 8]}$$

(Equation 9)

In addition, the homography matrix calculating unit 161 calculates Equations (10a), (10b), and (10c) on the basis of $h_{11}$, $h_{12}$, $h_{13}$, $h_{21}$, $h_{22}$, $h_{23}$, $h_{31}$, and $h_{32}$ in order to calculate the installation angle of the camera 102$a$ in the marker coordinate system. $\theta_{pitch}$ represents a component in a pitch direction of the installation angle of the camera 102$a$. $\theta_{roll}$ represents a component in a roll direction of the installation angle of the camera 102$a$. $\theta_{yaw}$ represents a component in a yaw direction of the installation angle of the camera 102$a$.

$$\theta_{pitch} = \sin^{-1}(h_{32}) \quad \text{(Equation 10a)}$$

$$\theta_{roll} = \tan^{-1}(-h_{21}/h_{22}) \quad \text{(Equation 10b)}$$

$$\theta_{yaw} = \tan^{-1}(-h_{13}/h_{33}) \quad \text{(Equation 10c)}$$

The optimization processing unit 162 performs an optimization process for the installation positions and the installation angles of the cameras 102$a$-102$d$, which are calculated by the homography matrix calculating unit 161, in order to reduce an error. For example, the optimization processing unit 162 performs the following calculation for the homography matrix $H_{(A2,a)}$.

The optimization processing unit 162 calculates an objective function representing a total sum of errors between coordinates $(x_{u1}, y_{v1})$, $(x_{u2}, y_{v2})$, $(x_{u3}, y_{v3})$, and $(x_{u4}, y_{v4})$ after coordinate transformation of the coordinates $(u_1, v_1)$, $(u_2, v_2)$ $(u_3, v_3)$, and $(u_4, v_4)$ in the corrected image coordinate system into the marker coordinate system on the basis of the homography matrix $H_{(A2,a)}$, and coordinates $(x_1, y_1)$, $(x_2, y_2)$, $(x_3, y_3)$, and $(x_4, y_4)$ of the known marker coordinate system, for the four feature points $P_{(a,1)}$, $P_{(a,2)}$, $P_{(a,3)}$, and $P_{(a,4)}$ of the calibration marker 101$a$. The optimization processing unit 162 searches a homography matrix $H_{(A2,a)}$ whose objective function value is the local minimum (the relative minimum), with a steepest descent method or other global optimal solution search method or the like. Then, the optimization processing unit 162 considers values of the installation positions and the installation angles calculated on the basis of the searched homography matrix $H_{(A2,a)}$ as optimal values.

With the calculation by the homography matrix calculating unit 161 and the optimization processing unit 162, the following eight installation positions and the installation angles are calculated. The coordinate system integrating unit 163 aligns the references of the installation positions and the installation angles of the cameras 102$a$-102$d$ with the vehicle coordinate system.

(2. 1) the installation position and the installation angle of the camera 102$a$ in the marker coordinate system of the calibration marker 101$a$;

(2. 2) the installation position and the installation angle of the camera 102$a$ in the marker coordinate system of the calibration marker 101$b$;

(2. 3) the installation position and the installation angle of the camera 102$b$ in the marker coordinate system of the calibration marker 101$c$;

(2. 4) the installation position and the installation angle of the camera 102$b$ in the marker coordinate system of the calibration marker 101$d$;

(2. 5) the installation position and the installation angle of the camera 102$c$ in the marker coordinate system of the calibration marker 101$b$;

(2. 6) the installation position and the installation angle of the camera 102$c$ in the marker coordinate system of the calibration marker 101$d$;

(2. 7) the installation position and the installation angle of the camera 102d in the marker coordinate system of the calibration marker 101c; and (2. 8) the installation position and the installation angle of the camera 102d in the marker coordinate system of the calibration marker 101a The coordinate system integrating unit 163 can calculate a relative position and a relative angle of the calibration marker 101c with respect to the calibration marker 101a by subtracting the installation position and the installation angle of (2. 8) from the installation position and the installation angle of (2. 7), respectively. The coordinate system integrating unit 163 can calculate the installation position and the installation angle of the camera 102b in the marker coordinate system of the calibration marker 101a, by subtracting the calculation results from the installation position and the installation angle of (2. 3), respectively.

The coordinate system integrating unit 163 can calculate a relative position and a relative angle of the calibration marker 101d with respect to the calibration marker 101c by subtracting the installation position and the installation angle of (2. 3) from the installation position and the installation angle of (2. 4), respectively. The coordinate system integrating unit 163 can calculate a relative position and a relative angle of the calibration marker 101d with respect to the calibration marker 101a by subtracting the relative position and the relative angle of the calibration marker 101c with respect to the calibration marker 101a from the relative position and the relative angle of the calibration marker 101d with respect to the calibration marker 101c, respectively. The coordinate system integrating unit 163 can calculate the installation position and the installation angle of the camera 102c in the marker coordinate system of the calibration markers 101a, by subtracting the calculation results from the installation position and the installation angle of (2. 6), respectively.

The coordinate system integrating unit 163 can calculate a relative position and a relative angle of the calibration marker 101b with respect to the calibration marker 101d by subtracting the installation position and the installation angle of (2. 6) from the installation position and the installation angle of (2. 5), respectively. The coordinate system integrating unit 163 can calculate a relative position and a relative angle of the calibration marker 101b with respect to the calibration marker 101a by subtracting the relative position and the relative angle of the calibration marker 101d with respect to the calibration marker 101a from the relative position and the relative angle of the calibration marker 101b with respect to the calibration marker 101d, respectively. The coordinate system integrating unit 163 can calculate the installation position and the installation angle of the camera 102a in the marker coordinate system of the calibration marker 101a, by subtracting the calculation results from the installation position and the installation angle of (2. 2), respectively. The installation position and the installation angle of the camera 102a in the marker coordinate system of the calibration marker 101a will be referred to as a second installation position and a second installation angle of the camera 102a, in order to distinguish them from the installation position and the installation angle of (2. 1).

The coordinate system integrating unit 163 subtracts the installation position and the installation angle of (2. 1) from the installation position and the installation angle of the camera 102b in the marker coordinate matrix of the calibration marker 101a, respectively. Thereby, a relative position and a relative angle of the camera 102b with respect to the camera 102a are calculated. Similarly, the coordinate system integrating unit 163 calculates a relative position and a relative angle of the camera 102c and a relative position and a relative angle of the camera 102d with respect to the camera 102a.

The coordinate system integrating unit 163 calculates the installation positions and the installation angles of the cameras 102a-102d in the vehicle coordinate system, on the basis of the relative positions and the relative angles of the cameras 102b, 102c, and 102d with respect to the camera 102a.

An error (closure error) has been generated between the second installation position and installation angle of the camera 102a and the installation position and installation angle of (2. 1), due to accumulation of calculation errors or the like. The error distributing unit 164 distributes the error of the installation position and the error of the installation angle of the camera 102a in the vehicle coordinate system to the installation positions and the installation angles of the cameras 102a-102d in the vehicle coordinate system, respectively. For example, the error distributing unit 164 distributes the error of the installation position with the equally-distributing rule, the compass rule, the transit rule, or the like, and evenly distributes the error of the installation angles. By distributing the errors, uneven distribution of the calculation errors is eliminated with respect to the installation position and the installation angle of the camera 102a in the vehicle coordinate system. However, the distribution of the closure error may result in displacement of a subject image in the vicinity of boundaries of the image region of the overhead view image 250.

The parameter correcting unit 165 corrects the deviation generated in the overhead view image 250 due to the distribution of the closure errors by the error distributing unit 164. The parameter correcting unit 165 reduces the deviation caused by the distribution of the closure errors, by performing the calculation using positions of the following eight types of feature points in the vehicle coordinate system.

(3. 1) coordinates of four feature points of the calibration marker 101a in the corrected image A2;

(3. 2) coordinates of four feature points of the calibration marker 101a in the corrected image D2;

(3. 3) coordinates of four feature points of the calibration marker 101b in the corrected image A2;

(3. 4) coordinates of four feature points of the calibration marker 101b in the corrected image C2;

(3. 5) coordinates of four feature points of the calibration marker 101c in the corrected image B2;

(3. 6) coordinates of four feature points of the calibration marker 101c in the corrected image D2;

(3. 7) coordinates of four feature points of the calibration marker 101d in the corrected image B2; and (3. 8) coordinates of four feature points of the calibration marker 101d in the corrected image C2

The parameter correcting unit 165 calculates a barycenter of (3. 1) and a barycenter of (3. 2) to calculate an average coordinate Ga of the two barycenters. The parameter correcting unit 165 calculates a barycenter of (3. 3) and a barycenter of (3. 4) to calculate an average coordinate Gb of the two barycenters. The parameter correcting unit 165 calculates a barycenter of (3. 5) and a barycenter of (3. 6) to calculate an average coordinate Gc of the two barycenters. The parameter correcting unit 165 calculates a barycenter of (3. 7) and a barycenter of (3. 8) to calculate an average coordinate Gd of the two barycenters.

The parameter correcting unit 165 finely adjusts the installation position and the installation angle of the camera 102a in the vehicle coordinate system in such a manner that the barycenter of (3. 1) moves to the average coordinate Ga and the barycenter of (3. 3) moves to the average coordinate Gb.

The parameter correcting unit 165 finely adjusts the installation position and the installation angle of the camera 102b in the vehicle coordinate system in such a manner that the barycenter of (3. 5) moves to the average coordinate Gc and the barycenter of (3. 7) moves to the average coordinate Gd.

The parameter correcting unit 165 finely adjusts the installation position and the installation angle of the camera 102c in the vehicle coordinate system in such a manner that the barycenter of (3. 4) moves to the average coordinate Gb and the barycenter of (3. 8) moves to the average coordinate Gd.

The parameter correcting unit 165 finely adjusts the installation position and the installation angle of the camera 102d in the vehicle coordinate system in such a manner that the barycenter of (3. 2) moves to the average coordinate Ga and the barycenter of (3. 6) moves to the average coordinate Gc. The fine adjustments described above mean that the installation positions and the installation angles calculated by the coordinate integrating unit 163 are corrected.

The mapping table updating unit 166 updates the mapping table, on the basis of the installation positions and the installation angles of the cameras 102a-102d in the vehicle coordinate system after the fine adjustment. The mapping table updating unit 166 updates initial values of the mapping table, on the basis of errors between the installation positions and installation angles of the cameras 102a-102d that have been estimated in initial values of the mapping table, and the installation positions and installation angles of the cameras 102a-102d after the fine adjustment.

(Calibration Correctness Determining Unit 107)

Figure 8:
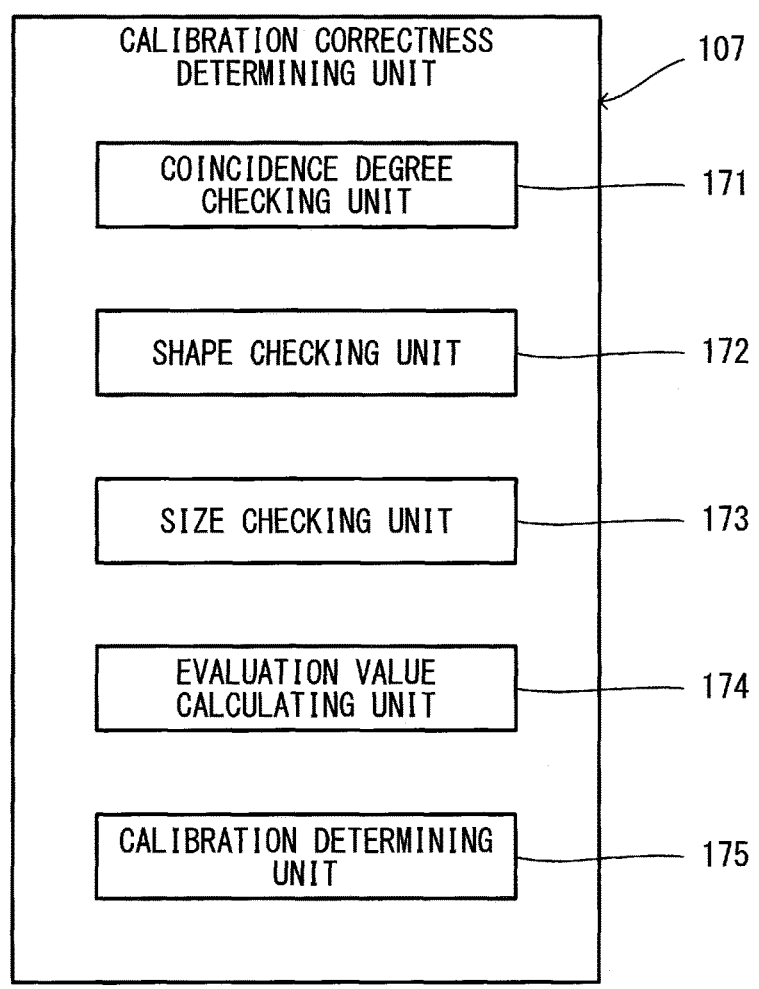
FIG. 8 A view showing one configuration example of a calibration correctness determining unit.

As shown in FIG. 8, the calibration correctness determining unit 107 includes a coincidence degree checking unit 171, a shape checking unit 172, a size checking unit 173, an evaluation value calculating unit 174, and a calibration determining unit 175.

The coincidence degree checking unit 171 checks a coincidence degree of the feature point coordinates after the coordinate transformation, for two homography matrices for coordinate transformation of each feature point coordinate of the calibration markers 101a-101d into the marker coordinate system of the respective calibration markers. Specifically, the coincidence degree checking unit 171 calculates the following four coordinate errors.

(4. 1) a coordinate error between the coordinate after the coordinate transformation of the feature point coordinate of the calibration marker 101a included in the corrected image A2 with the homography matrix $H_{(A2, a)}$ and the coordinate after the coordinate transformation of the feature point coordinate of the calibration marker 101a included in the corrected image D2 with the homography matrix $H_{(D2, a)}$;

(4. 2) a coordinate error between the coordinate after the coordinate transformation of the feature point coordinate of the calibration marker 101b included in the corrected image A2 with the homography matrix $H_{(A2, b)}$ and the coordinate after the coordinate transformation of the feature point coordinate of the calibration marker 101b included in the corrected image C2 with the homography matrix $H_{(C2, b)}$;

(4. 3) a coordinate error between the coordinate after the coordinate transformation of the feature point coordinate of the calibration marker 101c included in the corrected image B2 with the homography matrix $H_{(B2, c)}$ and the coordinate after the coordinate transformation of the feature point coordinate of the calibration marker 101c included in the corrected image D2 with the homography matrix $H_{(D2, c)}$; and (4. 4) a coordinate error between the coordinate after the coordinate transformation of the feature point coordinate of the calibration marker 101d included in the corrected image 1B2 with the homography matrix $H_{(B2, d)}$ and the coordinate after the coordinate transformation of the feature point coordinate of the calibration marker 101d included in the corrected image C2 with the homography matrix $H_{(C2, d)}$.

The shape checking unit 172 checks shapes that are drawn by the feature point coordinates of the calibration markers 101a-101d in the overhead view image 250 generated by the use of the mapping table after the update. The shape checking unit 172 calculates slopes of the following four sides in the vehicle coordinate system, for the calibration marker 101a included in the corrected image A2.

(5. 1) a side $E_{(A2, a, 1)}$ connecting the feature point $P_{(a, 1)}$ and the feature point $P_{(a, 2)}$ after the coordinate transformation into the vehicle coordinate system;

(5. 2) a side $E_{(A2, a, 2)}$ connecting the feature point $P_{(a, 2)}$ and the feature point $P_{(a, 3)}$ after the coordinate transformation into the vehicle coordinate system;

(5. 3) a side $E_{(A2, a, 3)}$ connecting the feature point $P_{(a, 3)}$ and the feature point $P_{(a, 4)}$ after the coordinate transformation into the vehicle coordinate system; and (5. 4) a side $E_{(A2, 4)}$ connecting the feature point $P_{(a, 4)}$ and the feature point $P_{(a, 1)}$ after the coordinate transformation into the vehicle coordinate system If the installation positions and the installation angles of the cameras 102a-102d are correctly calibrated by the calibration unit 106, the side $E_{(A2, a, 1)}$ and the side $E_{(A2, a, 3)}$ are parallel to each other and the side $E_{(A2, a, 2)}$ and the side $E_{(A2, a, 4)}$ are also parallel to each other. Furthermore, the side $E_{(A2, a, 2)}$ and the side $E_{(A2, a, 4)}$ are orthogonal to the side $E_{(A2, a, 1)}$ and also orthogonal to the side $E_{(A2, a, 3)}$.

The shape checking unit 172 calculates an angle formed by the side $E_{(A2, a, 1)}$ and the side $E_{(A2, a, 3)}$ and calculates an angle error by subtracting 180 degrees from the angle. The shape checking unit 172 calculates an angle formed by the side $E_{(A2, a, 2)}$ and the side $E_{(A2, a, 4)}$ and calculates an angle error by subtracting 180 degrees from the angle. The shape checking unit 172 calculates an angle formed by the side $E_{(A2, a, 1)}$ and the side $E_{(A2, a, 2)}$ and calculates an angle error by subtracting 90 degrees from the angle. The shape checking unit 172 calculates an angle formed by the side $E_{(A2, a, 1)}$ and the side $E_{(A2, a, 4)}$ and calculates an angle error by subtracting 90 degrees from the angle. The shape checking unit 172 calculates an angle formed by the side $E_{(A2, a, 3)}$ and the side $E_{(A2, a, 2)}$ and calculates an angle error by subtracting 90 degrees from the angle. The shape checking unit 172 calculates an angle formed by the side $E_{(A2, a, 3)}$ and the side $E_{(A2, a, 4)}$ and calculates an angle error by subtracting 90 degrees from the angle.

The shape checking unit 172 performs the same process for each corrected image and for each calibration marker included in the corrected image.

The size checking unit 173 checks the sizes of the calibration markers 101a-101d in the overhead view image 250, on the basis of the feature point coordinates of the calibration markers 101a-101d in the vehicle coordinate system. The size checking unit 173 calculates the following four distances by the use of the feature point coordinate of the calibration marker 101al included in the corrected image A2.

(6. 1) a distance between the feature point $P_{(a, 1)}$ and the feature point $P_{(a, 2)}$ after the coordinate transformation into the vehicle coordinate system;

(6. 2) a distance between the feature point $P_{(a, 2)}$ and the feature point $P_{(a, 3)}$ after the coordinate transformation into the vehicle coordinate system;

(6. 3) a distance between the feature point $P_{(a, 3)}$ and the feature point $P_{(a, 4)}$ after the coordinate transformation into the vehicle coordinate system; and (6. 4) a distance between the feature point $P_{(a, 4)}$ and the feature point $P_{(a, 1)}$ after the coordinate transformation into the vehicle coordinate system The distances of (6. 1), (6. 2), (6. 3), and (6. 4) ideally coincide with the lengths L of four sides of the rectangular figure of the calibration markers 101a-101d that are described in the calibration manual or the like. The shape checking unit 172 calculates a distance error by subtracting the distance L from the distance of (6. 1). The shape checking unit 172 calculates a distance error by subtracting the distance L from the distance of (6. 2). The shape checking unit 172 calculates a distance error by subtracting the distance L from the distance of (6. 3). The shape checking unit 172 calculates a distance error by subtracting the distance L from the distance of (6. 4).

The size checking unit 173 performs the same process for each corrected image and for each calibration marker included in the corrected image.

The evaluation value calculating unit 174 calculates the maximum value δ1 of the coordinate error which is calculated by the coincidence degree checking unit 171, the maximum value δ2 of the angle error which is calculated by the shape checking unit 172, and the maximum value δ3 of the distance error which is calculated by the size checking unit 173, as an evaluation value (δ1, δ2, δ3) of the calibration of the cameras 102a-102d.

The calibration determining unit 175 determines whether the calibration of the cameras 102a-102d is correct or not, on the basis of the maximum value δ1 of the coordinate error, the maximum value δ2 of the angle error, and the maximum value δ3 of the distance error which are calculated by the evaluation value calculating unit 174. The calibration determining unit 175 determines that the calibration of the cameras 102a-102d is correct, if the maximum value δ1 of the coordinate error is less than a predetermined threshold T1, the maximum value δ2 of the angle error is less than a predetermined threshold T2, and the maximum value δ3 of the distance error is less than a predetermined threshold T3.

The calibration correctness determining unit 107 outputs information about the determination result to the state analyzing unit 108. In other words, if the calibration correctness determining unit 107 determines that the calibration of the cameras 102a-102d is correct, the calibration correctness determining unit 107 sends information indicating the correctness to the state analyzing unit 108. Furthermore, if the calibration correctness determining unit 107 determines that the calibration of the cameras 102a-102d is incorrect, the calibration correctness determining unit 107 outputs information indicating the incorrectness, the coordinate error calculated by the coincidence degree checking unit 107, the angle error calculated by the shape checking unit 172, the distance error calculated by the size checking unit 173, and the evaluation value calculated by the evaluation value calculating unit 174 to the state analyzing unit 108.

(State Analyzing Unit 108)

Figure 9:
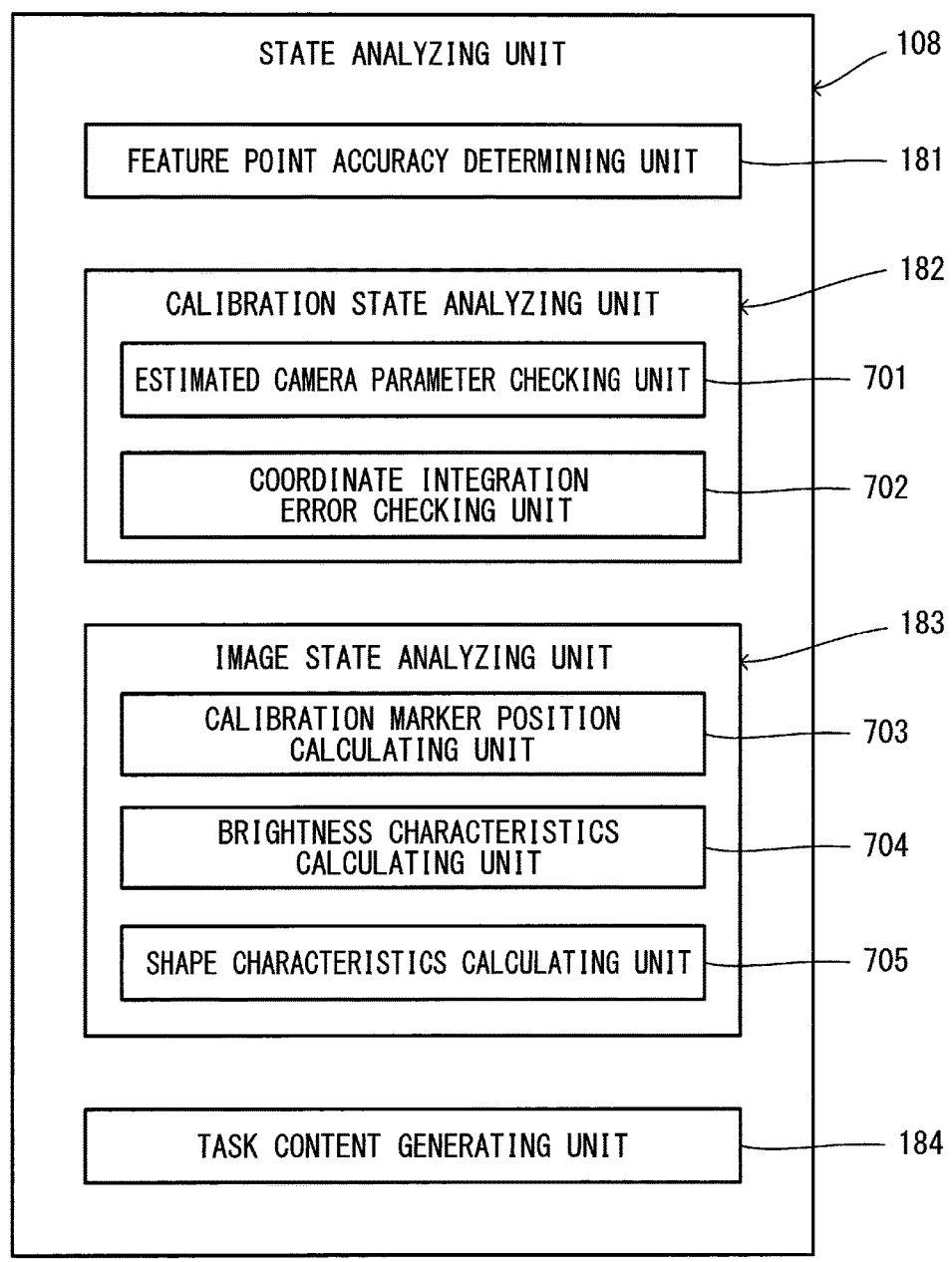
FIG. 9 A view showing one configuration example of a state analyzing unit.

The state analyzing unit 108 analyzes the calibration state of the cameras 102a-102d, on the basis of the determination result of the image correctness determining unit 105, the determination result of the calibration correctness determining unit 107, the local minimum value of the objective function calculated by the optimization processing unit 162, the closure error of the installation position and the closure error of the installation angle of the camera 102a calculated by the coordinate system integrating unit 163, and the captured images A1-D1. The state analyzing unit 108 includes a feature point accuracy determining unit 181, a calibration state analyzing unit 182, an image state analyzing unit 183, and a task content generating unit 184, as shown in FIG. 9.

If the calibration unit 106 fails the calibration of the cameras 102a-102d, the feature point accuracy determining unit 181 determines whether a cause thereof consists in an accuracy in the feature point coordinates or not. The state analyzing unit 108 distinguishes the causes of the failure of the calibration of the cameras 102a-102d, on the basis of the determination result of the feature point accuracy determining unit 181.

If the installation positions and installed postures of the calibration markers 101a-101d and the installation positions and the installation angles of the cameras 102a-102d can be arbitrarily determined, it is difficult to determine the accuracy in the feature point coordinates by a method of determining whether they are detected at specific positions or not. Because the accuracy of sub-pixel level is required for the feature point coordinates, it is also difficult to perform the determination from the states of edges or the like that are detected in a pixel level.

The feature point accuracy determining unit 181 determines the accuracy in the feature point coordinates, on the basis of the local minimum value of the objective function calculated by the optimization processing unit 162 of the calibration unit 106. If the feature point coordinates are correctly calculated in the image correctness determining unit 105, the optimization processing unit 162 of the calibration unit 106 can match the feature point coordinates with the theoretical values of the feature point coordinates. On the other hand, if the feature point coordinates are not correctly calculated in the image correctness determining unit 105, the optimization process of the calibration unit 106 cannot match the feature point coordinates with the theoretical values of the feature point coordinates, with the result that the value of the objective function is not reduced. The feature point accuracy determining unit 181 determines that the accuracy in the feature point coordinates is incorrect if a convergence value of the objective function is not less than a predetermined threshold, and determines that the accuracy in the feature point coordinates is correct if the convergence value of the objective function is less than a predetermined threshold. The value of the predetermined threshold has been previously determined by experiments or the like in a design stage.

The calibration state analyzing unit 182 includes an estimated camera parameter checking unit 701 and a coordinate integration error checking unit 702.

The estimated camera parameter checking unit 701 determines whether the parameters required for the calibration of the cameras 102a-102d that are input by the serviceman are incorrect or not. The estimated camera parameter checking unit 701 calculates errors between the installation positions and the installation angles of the cameras 102a-d calculated by the calibration unit 106 and the installation positions and the installation angles of the cameras 102a-102d that have been previously set. It has been found that if the parameters required for the calibration of the cameras 102a-102d that are input by the serviceman are incorrect, a large error tends to occur only for the installation positions in the height directions of the cameras 102a-102d. If a large error occurs only for the installation positions in the height directions of the cameras 102a-102d, the estimated camera parameter checking unit 701 determines that the parameters required for the calibration of the cameras 102a-102d that are input by the serviceman are incorrect.

The coordinate integration error checking unit 702 checks an error that is generated when the calibration unit 106 performs integration of the coordinate systems that constitute reference systems of the installation position and the installation angle of the camera 102a. If the initial values of the installation positions of the cameras 102a-d input by the serviceman are substantially erroneous, the closure error calculated in the process of the coordinate system integrating unit 163 tends to be large. The coordinate integration error checking unit 702 then determines whether the closure error that is calculated in the process of the coordinate system integrating unit 163 is not less than a predetermined value or not.

The image state analyzing unit 183 includes a calibration marker position calculating unit 703, a brightness characteristics calculating unit 704, and a shape characteristics calculating unit 705. The calibration marker position calculating unit 703 detects the calibration markers 101a-101d from the corrected images A2-D2 and generates the overhead view image 250 based on the corrected images A2-D2 using the mapping table before the update. The calibration marker position calculating unit 703 calculates positions of the barycenters of the calibration markers 101a-101d in the overhead view image 250. The image state analyzing unit 183 can check whether the positions at which the serviceman has installed the calibration markers 101a-101d are correct or not, on the basis of the calculated positions of the barycenters of the calibration markers 101a-101d.

The brightness characteristics calculating unit 704 acquires a brightness signal from each pixel of the captured images A1-D1 in order to calculate information such as an average value of the brightness signals, the maximum value of the brightness signals, and variations of the brightness signals between adjacent pixels. The image state analyzing unit 183 can check whether the brightness of the captured images A1-D1 is correct or not by means of the calculated information about the brightness of the captured images A1-D1.

The shape characteristics calculating unit 705 extracts a variety of feature amounts for the positional relationship of the feature point coordinates of the calibration markers 101a-101d. The shape characteristics calculating unit 705 performs a homography calculating process and an optimization process in order to calculate the installation positions and the installation angles of the cameras 102a-102d before the integration of the coordinate systems. The shape characteristics calculating unit 705 then applies the same process as the calibration correctness determining unit 107 does, on the installation positions and the installation angles of the cameras 102a-102d before the integration of the coordinate systems. The image state analyzing unit 183 checks whether a cause of the incorrectness of the captured images A1-D1 consists in a process before the integration of the coordinate system or not.

The task content generating unit 184 determines a cause of the failure of the calibration by the use of a variety of information that is calculated by the image state analyzing unit 182 and the calibration state analyzing unit 183, in order to present measures against the cause to the serviceman. The task content generating unit 184 determines the following causes of the calibration failure, for example.

Cause 1. the captured images A1-D1 are incorrect and the images are too dark.
Cause 2. the captured images A1-D1 are incorrect and the images are too bright.
Cause 3. the captured images A1-D1 are incorrect and the installation positions of the calibration markers 101a-101d are incorrect.
Cause 4. the captured images A1-D1 are incorrect, and the coordinates of the feature points that are specified by the serviceman in the feature point input requiring unit 155 largely deviate from true feature points.
Cause 5. the captured images A1-D1 are incorrect and the parameters that are input by the serviceman at the beginning of the calibration are incorrect.
Cause 6. the calibration is incorrect, the accuracy in the feature points is insufficient, and the images are too bright.
Cause 7. the calibration is incorrect, the accuracy in the feature points is insufficient, and the images are too dark.
Cause 8. the calibration is incorrect, the accuracy in the feature points is insufficient, and the images are shaded.
Cause 9. the calibration is incorrect, the accuracy in the feature points is insufficient, and the coordinates of the feature points that are specified by the serviceman in the feature point input requiring unit 155 largely deviate from true feature points.
Cause 10. the calibration is incorrect, the accuracy in the feature points is insufficient, and the installation positions of the calibration markers 101a-101d are incorrect.
Cause 11. the calibration is incorrect, the accuracy in the feature points is insufficient, and the parameters that are input by the serviceman at the beginning of the calibration are incorrect.
Cause 12. the calibration is incorrect, and the accuracy in the feature points is sufficient, but the sizes of the calibration markers are different.
Cause 13. the calibration is incorrect, and the accuracy in the feature points is sufficient, but the parameters that are input by the serviceman at the beginning of the calibration are incorrect.

It will be noted that if the task content generating unit 184 cannot specify one single cause, the task content generating unit 184 can determine a plurality of causes among the causes 1-13 as long as they are not inconsistent. The inconsistent determination means, for example, a case where the cause "the images are too dark" and the cause "the images are too bright" are simultaneously determined, or a case where the a cause involving the condition "the accuracy in the feature points is insufficient" and the cause involving the condition "the accuracy in the feature points is sufficient" are simultaneously determined.

If it is determined by the image correctness determining unit 105 that the captured images are incorrect, the task content generating unit 184 narrows the possible causes of the calibration failure down to the causes 1-5. The task content generating unit 184 also determines whether the situation corresponds to the cause 1 or cause 2 or not, on the basis of information about the brightness signals of the pixels of the captured images A1-D1 that is calculated by the brightness characteristics calculating unit 704. For example, if both the average value and the maximum value of the brightness signals of the pixels of the captured images A1-D1 are higher than a predetermined threshold I1, the task content generating unit 184 determines that the situation corresponds to the cause 2. In addition, if both the average value and the maximum value of the brightness signals of the pixels of the captured images A1-D1 are lower than a predetermined threshold I2 (<I1), the task content generating unit 184 determines that the situation corresponds to the cause 1.

If the positions of the barycenters of the calibration markers 101a-101d in the overhead view image that are output by the calibration marker position checking unit 703 deviate from a predetermined range, the task content generating unit 184 determines that the situation corresponds to the cause 3.

The task content generating unit 184 calculates a difference between the maximum value of the brightness in the vicinity of the feature point coordinate and the minimum value of the brightness in the vicinity of the feature point coordinate, on the basis of the brightness signals of the pixels of the captured images A1-D1 calculated by the brightness characteristics calculating unit 704. If the difference is less than a predetermined value, the task content generating unit 184 determines that the situation corresponds to the cause 4, because it is highly possible that the feature point coordinates that are input by the serviceman in response to the requirement by the feature point input requiring unit 155 largely deviate from true feature point coordinates.

If a difference between the maximum value and the minimum value of the lengths of four sides of each rectangular figure of the calibration markers 101a-101d is not less than a predetermined threshold in the captured images A1-D1, the task content generating unit 184 determines the situation corresponds to the cause 5. Here, the predetermined threshold is the maximum value of the difference that can be theoretically caused by the installation angles of the cameras 102a-102d, and has previously been set in the design stage of the in-vehicle device 100.

If it is determined that the images are correct in the image correctness determining unit 105, but it is determined that the calibration is incorrect in the calibration correctness determining unit 107, and it is determined that the accuracy in the feature points is correct in the feature point accuracy determining unit 181, the task content generating unit 184 determines that the situation corresponds to the cause 12 or the cause 13.

If the estimated camera parameter checking unit 701 of the calibration state analyzing unit 182 determines that the initial values of the installation positions and the installation angles of the cameras 102a-d that are set by the serviceman are incorrect, the task content generating unit 184 determines that the situation corresponds to the cause 12.

If the closure error that is calculated in the process of the coordinate system integrating unit 163 is not less than a predetermined value, the task content generating unit 184 determines that the situation corresponds to the cause 13.

If it is determined that the images are correct in the image correctness determining unit 105, but it is determined that the calibration is incorrect in the calibration correctness determining unit 107, and it is determined that the accuracy in the feature points is incorrect in the feature point accuracy determining unit 181, the task content generating unit 184 determines that the situation corresponds to at least one of the causes 6, 7, 8, 9, 10, and 11.

If it is determined that the images are correct in the image correctness determining unit 105, but it is determined that the calibration is incorrect in the calibration correctness determining unit 107, and it is determined that the accuracy in the feature points is incorrect in the feature point accuracy determining unit 181, and further if both the average value and the maximum value of the brightness signals of the pixels of the captured images A1-D1 are higher than the predetermined threshold I1, the task content generating unit 184 determines that the situation corresponds to the cause 6.

If it is determined that the images are correct in the image correctness determining unit 105, but it is determined that the calibration is incorrect in the calibration correctness determining unit 107, and it is determined that the accuracy in the feature points is incorrect in the feature point accuracy determining unit 181, and further if both the average value and the maximum value of the brightness signals of the pixels of the captured images A1-D1 are lower than the predetermined threshold I2 (<I1), the task content generating unit 184 determines that the situation corresponds to the cause 7.

If it is determined that the images are correct in the image correctness determining unit 105, but it is determined that the calibration is incorrect in the calibration correctness determining unit 107, and it is determined that the accuracy in the feature points is incorrect in the feature point accuracy determining unit 181, and further if the calibration marker position checking unit 703 is out of a predetermined range, the task content generating unit 184 determines that the situation corresponds to the cause 10.

If it is determined that the images are correct in the image correctness determining unit 105, but it is determined that the calibration is incorrect in the calibration correctness determining unit 107, and it is determined that the accuracy in the feature points is incorrect in the feature point accuracy determining unit 181, the task content generating unit 184 calculates a difference between the maximum value of the brightness in the vicinity of the feature point coordinate and the minimum value of the brightness in the vicinity of the feature point coordinate, on the basis of the brightness signals of the pixels of the captured images A1-D1 calculated by the brightness characteristics calculating unit 704. If the difference is less than a predetermined value, the task content generating unit 184 determines that the situation corresponds to the cause 9, because it is highly possible that the feature point coordinates that are input by the serviceman in response to the requirement by the feature point input requiring unit 155 largely deviate from true feature point coordinates.

If it is determined that the images are correct in the image correctness determining unit 105, but it is determined that the calibration is incorrect in the calibration correctness determining unit 107, and it is determined that the accuracy in the feature points is incorrect in the feature point accuracy determining unit 181, and further if the average value of brightness of a train of the brightness signals on a single edge detected by executing an edge detecting process on the corrected images A2-D2 varies beyond a predetermined threshold and the brightness varies in a reciprocating manner between a high brightness and a low brightness, the task content generating unit 184 determines that the situation corresponds to the cause 8.

If it is determined that the images are correct in the image correctness determining unit 105, but it is determined that the calibration is incorrect in the calibration correctness determining unit 107, and it is determined that the accuracy in the feature points is incorrect in the feature point accuracy determining unit 181, and further if the difference between the maximum value and the minimum value of the lengths of four sides of each rectangular figure of the calibration markers 101a-101d is not less than the predetermined threshold in the captured images A1-D1, the task content generating unit 184 determines that the situation corresponds to the cause 11.

If the situation corresponds to either one of the causes 1, 2, 6, and 7, the task content generating unit 184 displays a message that prompts the serviceman to adjust illumination, on the display unit 109.

In addition, if the situation corresponds to either the cause 1 or the cause 7, the task content generating unit 184 displays a message that prompts to perform a calibration during daytime hours on the display unit 109, in consideration of the possibility of performing the calibration outdoors.

If the situation corresponds to either the cause 3 or the cause 10, the task content generating unit 184 instructs the serviceman to shift the calibration markers 101*a*-101*d*. It is here preferable that the task content generating unit 184 further instructs the direction of the shift of the calibration markers 101*a*-101*d*, on the basis of the feature point coordinates of the calibration markers 101*a*-101*d* and correct image regions that are used for the determination by the image determining unit 154.

If the situation corresponds to either the cause 5 or the cause 11, the task content generating unit 184 instructs the exchange of the cameras 102*a*-102*d* or the like, because of the possibility of failure of the cameras 102*a*-102*d*.

If the situation corresponds to the cause 8, the task content generating unit 184 instructs the serviceman to shift the calibration markers 101*a*-101*d* into a unshaded location.

If the situation corresponds to the cause 12, the task content generating unit 184 prompts the serviceman to check whether there is no error in either the currently used calibration markers 101*a*-101*d* or the information input through the input unit 104.

In the case of the cause 13, the task content generating unit 184 prompts the serviceman to verify whether the input values such as the lengths L of four sides of the rectangular figure of the calibration markers 101*a*-101*d* are erroneous.

Figure 10:
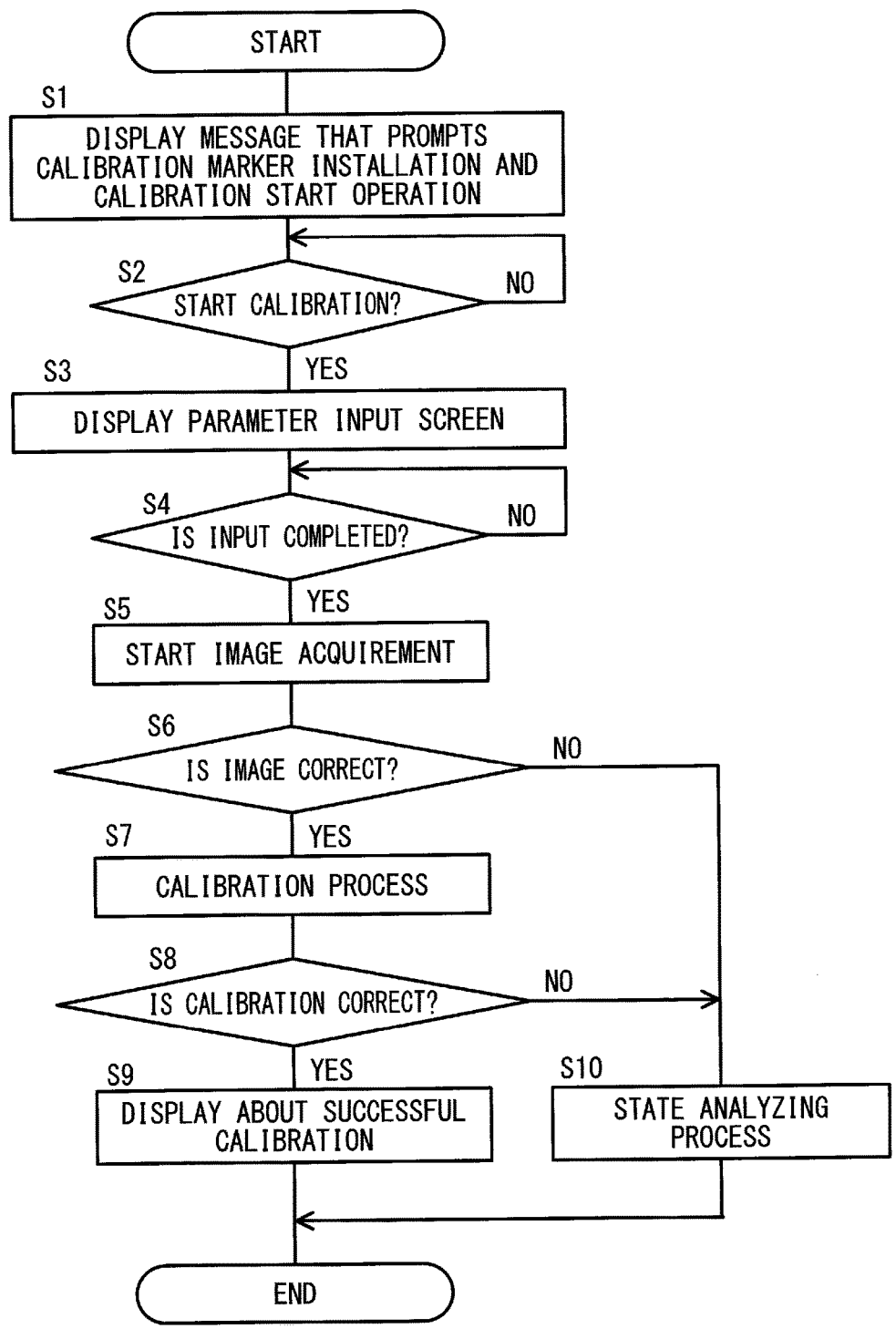
FIG. 10 A flowchart for an operation example of the camera calibration device.

FIG. 10 is a flowchart showing an operation that the in-vehicle device 100 starts when the in-vehicle device 100 is powered on, wherein the in-vehicle device 100 is connected to the cameras 102*a*-102*d*. This operation is performed by a CPU (not shown) of the in-vehicle device 100 executing a program stored in a memory (not shown).

In step S1, the in-vehicle device 100 displays a message such as "Install calibration markers and then perform a calibration starting operation." on the display unit 109.

In step S2, the in-vehicle device 100 specifically determines whether the operation of starting the calibration of the cameras 102*a*-102*d* has been performed through the input unit 104 or not. The in-vehicle device 100 repeats the process of step S2 until the operation of starting the calibration is performed, and proceeds a process of step 3 once the process of starting the calibration has been performed.

In step S3, the in-vehicle device 100 displays an input screen through which the serviceman inputs the parameters required for the calibration of the cameras 102*a*-102*d*, on the display unit 109.

In step S4, the in-vehicle device 100 determines whether the input of the parameters required for the calibration of the cameras 102*a*-102*d* has been completed or not. The in-vehicle device 100 repeats the process of step S4 until the input is completed. Once the input has been completed, the in-vehicle device 100 proceeds to a process of step S5.

In step S5, the in-vehicle device 100 starts acquirement of the captured images A1-D1 from the cameras 102*a*-102*d*. Accordingly, the image correctness determining unit 105 starts to determine whether the captured images A1-D1 are correct or not.

In step S6, the in-vehicle device 100 determines whether the captured images A1-D1 are correct or not. If the image correctness determining unit 105 determines that the captured images A1-D1 are correct, the in-vehicle device 100 proceeds to step S7. On the other hand, if the image correctness determining unit 105 determines that the captured images A1-D1 are incorrect, the in-vehicle device 100 proceeds to step S10.

In step S7, the in-vehicle device 100 executes the process of the calibration unit 106 to perform the calibration of the installation positions and the installation angles of the cameras 102*a*-102*d*.

In step S8, the in-vehicle device 100 determines whether the calibration of the installation states of the cameras 102*a*-102*d* is successful or not. If the calibration correctness determining unit 107 determines that the calibration of the cameras 102*a*-102*d* is correct, the in-vehicle device 100 proceeds to step S9. On the other hand, if the calibration correctness determining unit 107 determines that the calibration of the cameras 102*a*-102*d* is incorrect, the in-vehicle device 100 proceeds to step S10.

In step S9, the in-vehicle device 100 displays a message such as "The calibration of the cameras was successful." on the display unit 109. Thereafter, the in-vehicle device 100 finishes the process shown in FIG. 10.

In step S10, the in-vehicle device 100 executes the process of the state analyzing unit 108 to analyze causes of failure of the calibration of the cameras 102*a*-102*d*. The in-vehicle device 100 displays measures based on the result of the analysis performed by the state analyzing unit 108 on the display unit 109 and finishes the process shown in FIG. 10.

Figure 11:
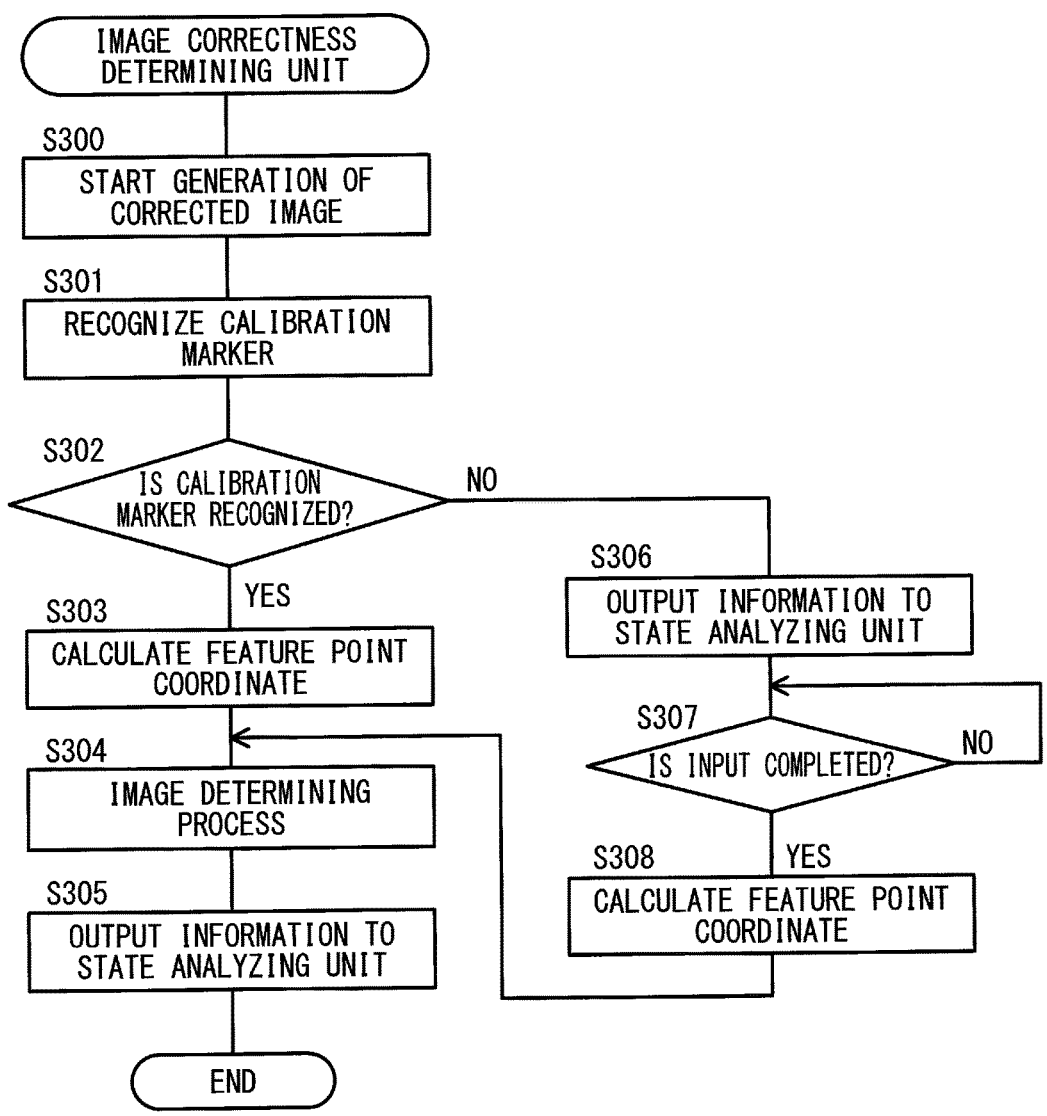
FIG. 11 One example of a flowchart for the image correctness determining unit.

FIG. 11 is a flowchart for a process of the image correctness determining unit 105. In step S300, the in-vehicle device 100 starts generation of the corrected images A2-D2 by a process of the corrected image generating unit 151. In step S301, the in-vehicle device 100 executes the process of the calibration marker recognizing unit 152 to recognize the calibration markers 101*a*-101*d*, on the basis of the corrected images A2-D2.

In step S302, the in-vehicle device 100 determines whether the calibration markers 101*a*-101*d* can be recognized or not. If the calibration markers 101*a*-101*d* can be recognized by the process of the calibration marker recognizing unit 152, the in-vehicle device 100 proceeds to a process of step S303. If the calibration markers 101*a*-101*d* cannot be recognized by the process of the calibration marker recognizing unit 152, e.g. if the brightness of the captured images A1-D1 is too bright or too dark, the in-vehicle device 100 proceeds to a process of step S306.

In step S303, the in-vehicle device 100 calculates the feature point coordinates for the recognized calibration markers 101*a*-101*d*.

In step S304, the in-vehicle device 100 executes a process of the image determining unit 154 to determine whether the captured images A1-D1 are correct. In step S305, the in-vehicle device 100 outputs information according to the determination result of step S304 to the information analyzing unit 108.

In step S306, the in-vehicle device 100 executes the process of the feature point input requiring unit 155.

In step S307, the in-vehicle device 100 determines whether the input of the feature points by the serviceman has been completed or not. The in-vehicle device 100 repeats the process of step S307 until the serviceman performs a predetermined operation of indicating the completion of the input, for example. When the serviceman performs the predetermined operation of indicating the completion of the input, the in-vehicle device 100 determines that the input of the feature points has been completed and proceeds to a process of step S308.

In step S308, the in-vehicle device 100 calculates the feature point coordinates for the feature points that are input by the serviceman. Thereafter, the in-vehicle device 100 proceeds to a process of step S304.

Figure 12:
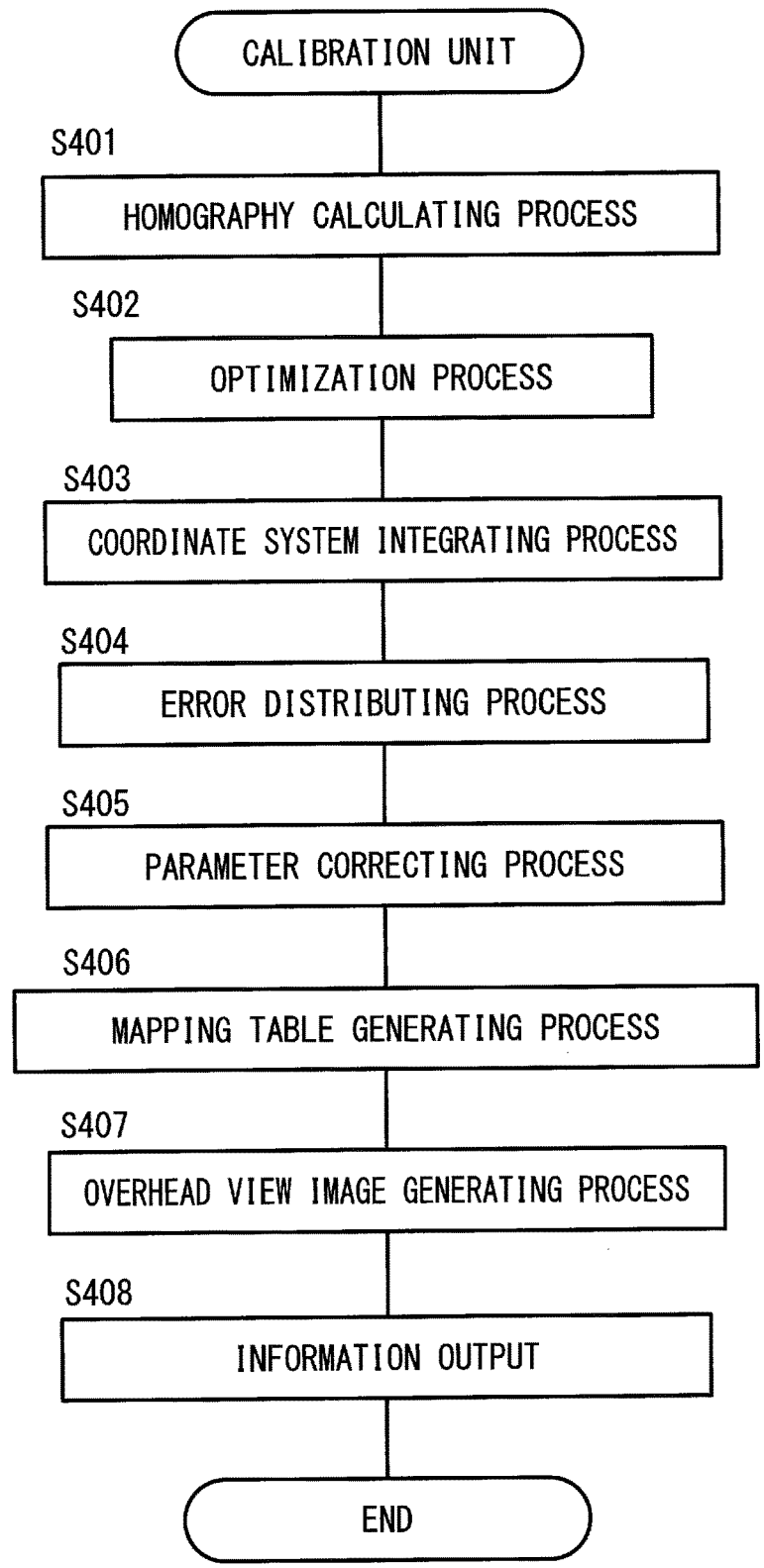
FIG. 12 A flowchart for the calibration unit of the camera calibration device according to the first embodiment of the present invention.

FIG. 12 is a flowchart for a process of the calibration unit 106. In step S401, the in-vehicle device 100 executes the process of the homography calculating unit 161 to calculate eight homography matrices for coordinate transformation of the feature point coordinates of the calibration markers 101a-101d into the marker coordinate system. The in-vehicle device 100 calculates the installation positions and the installation angles of the cameras 102a-102d on the basis of the calculated homography matrices.

In step S402, the in-vehicle device 100 executes a process of the optimization processing unit 162 in order to perform an optimization process for the installation positions and the installation angles of the cameras 102a-102d that are calculated with elements of the homography matrix.

In step S403, the in-vehicle device 100 executes a process of the coordinate system integrating unit 163, in order to align the references of the installation positions and the installation angles of the cameras 102a-102d that are optimized in the process of step S402 with the vehicle coordinate system.

In step S404, the in-vehicle device 100 executes the process of the error distributing unit 164 to distribute the closure error of the installation position and the closure error of the installation angle of the camera 102a in the vehicle coordinate system to the installation positions and the installation angles of the cameras 102a-102d in the vehicle coordinate system, respectively.

In step S405, the in-vehicle device 100 executes the process of the parameter correcting unit 165 to correct the deviation generated in the overhead view image 250 due to the distribution of the closure errors by the error distributing unit 164.

In step S406, the in-vehicle device 100 updates the mapping table, on the basis of the installation positions and the installation angles of the cameras 102a-102d in the vehicle coordinate system after the process of step S405.

In step S407, the in-vehicle device 100 performs coordinate transformation of the corrected images A2-D2 into the overhead view image 250 by the use of the mapping table that is updated in step S406.

In step S408, the in-vehicle device 100 outputs the overhead view image 250 generated in step S407, the objective function calculated in the optimization process of step S402, the closure error of the installation position and the closure error of the installation angle of the camera 102a in the marker coordinate system of the calibration markers 101 that are distributed in the error distribution process of step S404, to the state analyzing unit 108. In addition, the in-vehicle device 100 outputs the overhead view image 250 generated in step S407, and the homography matrix calculated in step S401 to the calibration correctness determining unit 107 and finishes the process of FIG. 12.

Figure 13:
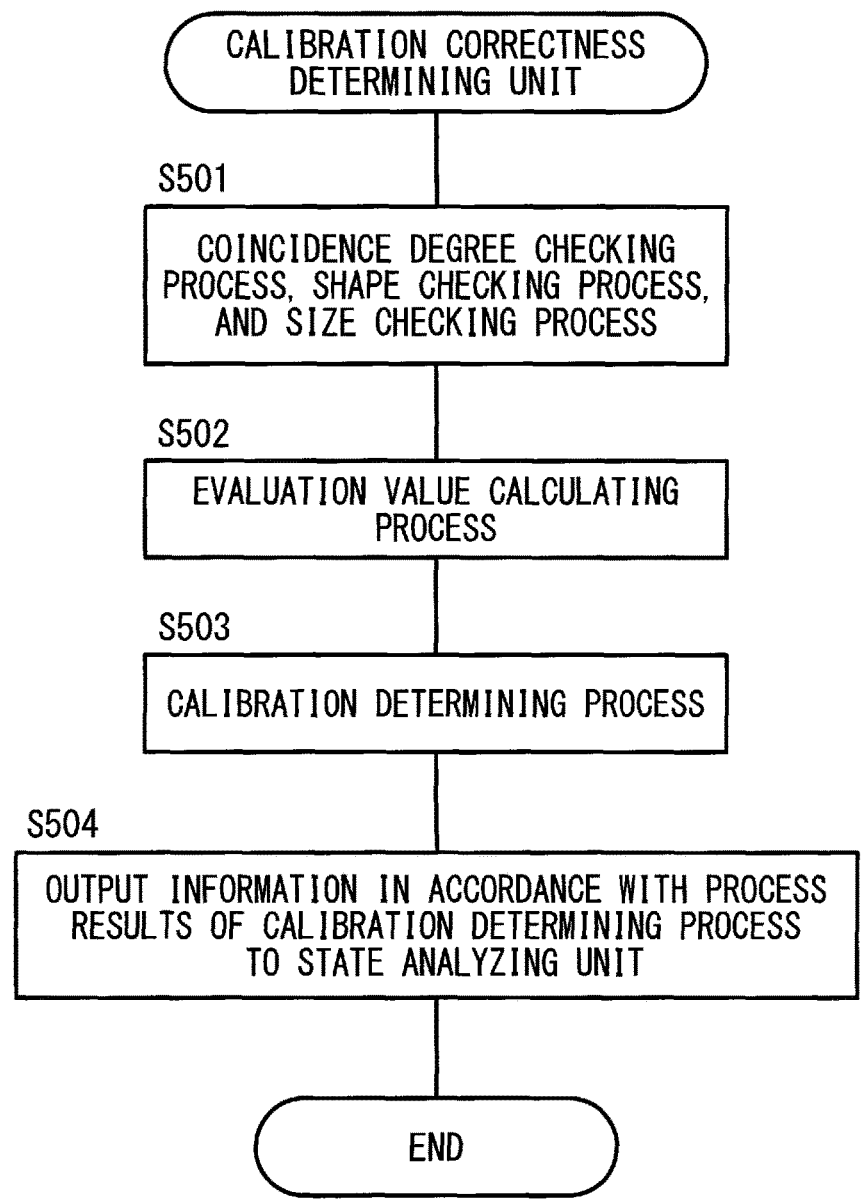
FIG. 13 A flowchart for the calibration correctness determining unit.

FIG. 13 is a flowchart for a process of the calibration correctness determining unit 107. In step S501, the in-vehicle device 100 executes processes of the coincidence degree checking unit 171, the shape checking unit 172, and the size checking unit 173. These processes may be executed in any order, or may be executed in parallel.

In step S502, the in-vehicle device 100 executes a process of the evaluation value calculating unit 174 and calculates an evaluation value based on calculation results of the coincidence degree checking unit 171, the shape checking unit 172, and the size checking unit 173.

In step S503, the in-vehicle device 100 executes the process of the calibration determining unit 175. In step S504, the in-vehicle device 100 outputs information to the state analyzing unit 108 in accordance with the determination result in step S503, and finishes the process shown in FIG. 13.

Figure 14:
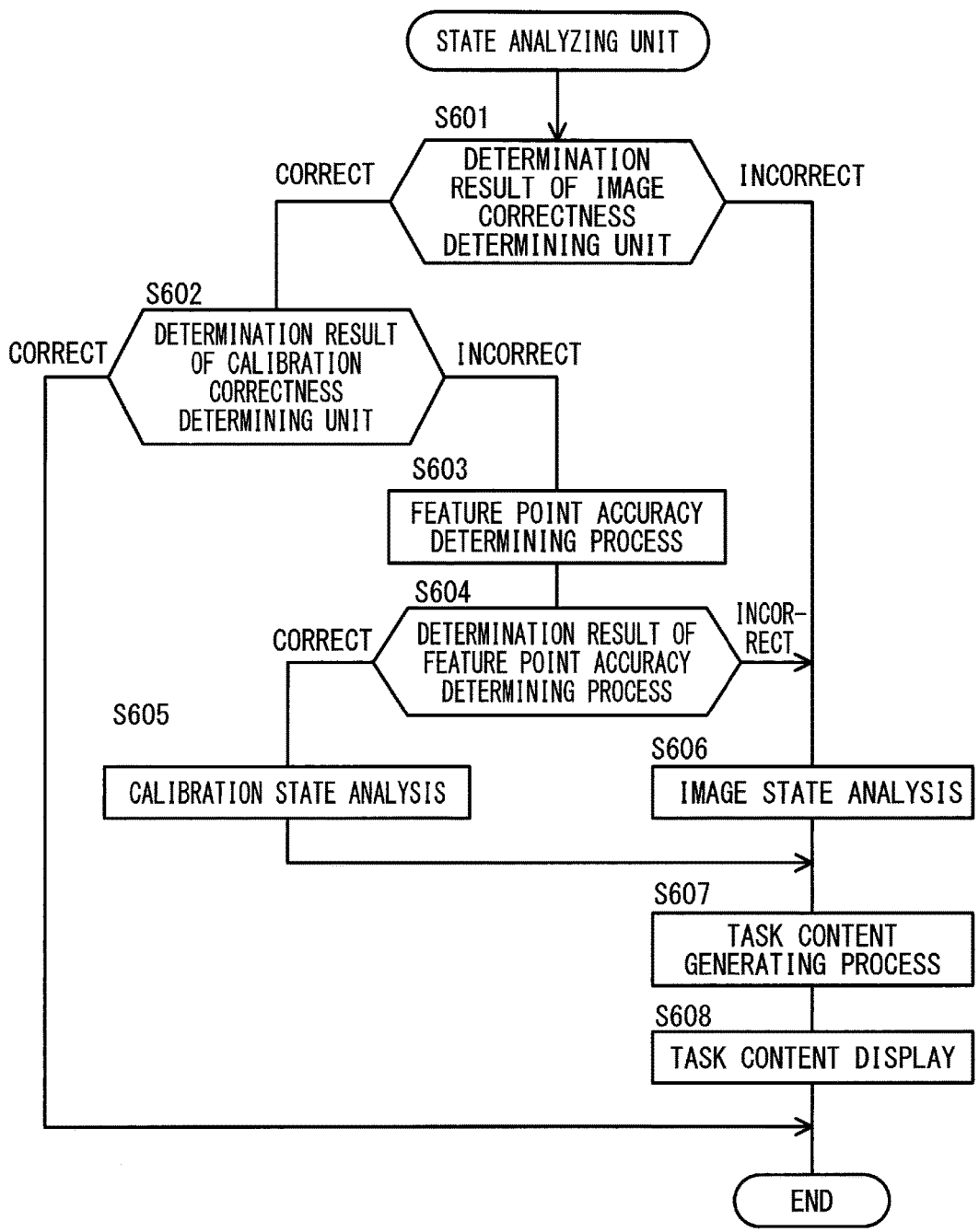
FIG. 14 A flowchart for the state analyzing unit.

FIG. 14 is a flowchart for a process of the state analyzing unit 108. In step S601, the in-vehicle device 100 determines whether the captured images A1-D1 are determined as correct in step S304 of FIG. 11 or not. If the captured images A1-D1 are determined as correct in step S304, the in-vehicle device 100 proceeds to a process of step S602. On the other hand, if the captured images A1-D1 are determined as incorrect in step S304, the in-vehicle device 100 proceeds to a process of step S606.

In step S602, the in-vehicle device 100 determines whether the calibration of the installation states of the cameras 102a-102d is determined as correct or incorrect in step S503 in FIG. 13. If it is determined that the calibration of the installation states of the cameras 102a-102d is correct in step S503, the in-vehicle device 100 finishes the process of FIG. 14. If the calibration of the installation states of the cameras 102a-102d is determined as incorrect in step S503, the in-vehicle device 100 proceeds to a process of step S603.

In step S603, the in-vehicle device 100 executes the process of the feature point accuracy determining unit 181. In step S604, the in-vehicle device 100 determines whether the feature point accuracy determining unit 181 determines that the accuracy in the feature point coordinates is correct in step S603. If the feature point accuracy determining unit 181 determines that the accuracy in the feature point coordinates is correct, the in-vehicle device 100 proceeds to a process of step S605. On the other hand, if the feature point accuracy determining unit 181 determines that the accuracy in the feature point coordinates is incorrect, the in-vehicle device 100 proceeds to a process of step S606.

In step S605, the in-vehicle device 100 executes a process of the calibration state analyzing unit 182. In step S606, the in-vehicle device 100 executes the process of the image state analyzing unit 183. In step S607, the in-vehicle device 100 executes the process of the task content generating unit 184. In step S608, the in-vehicle device 100 displays the task content of the serviceman generated by the task content generating unit 184 on the display unit 109 and finishes the process of FIG. 14.

Second Embodiment

Figure 15:
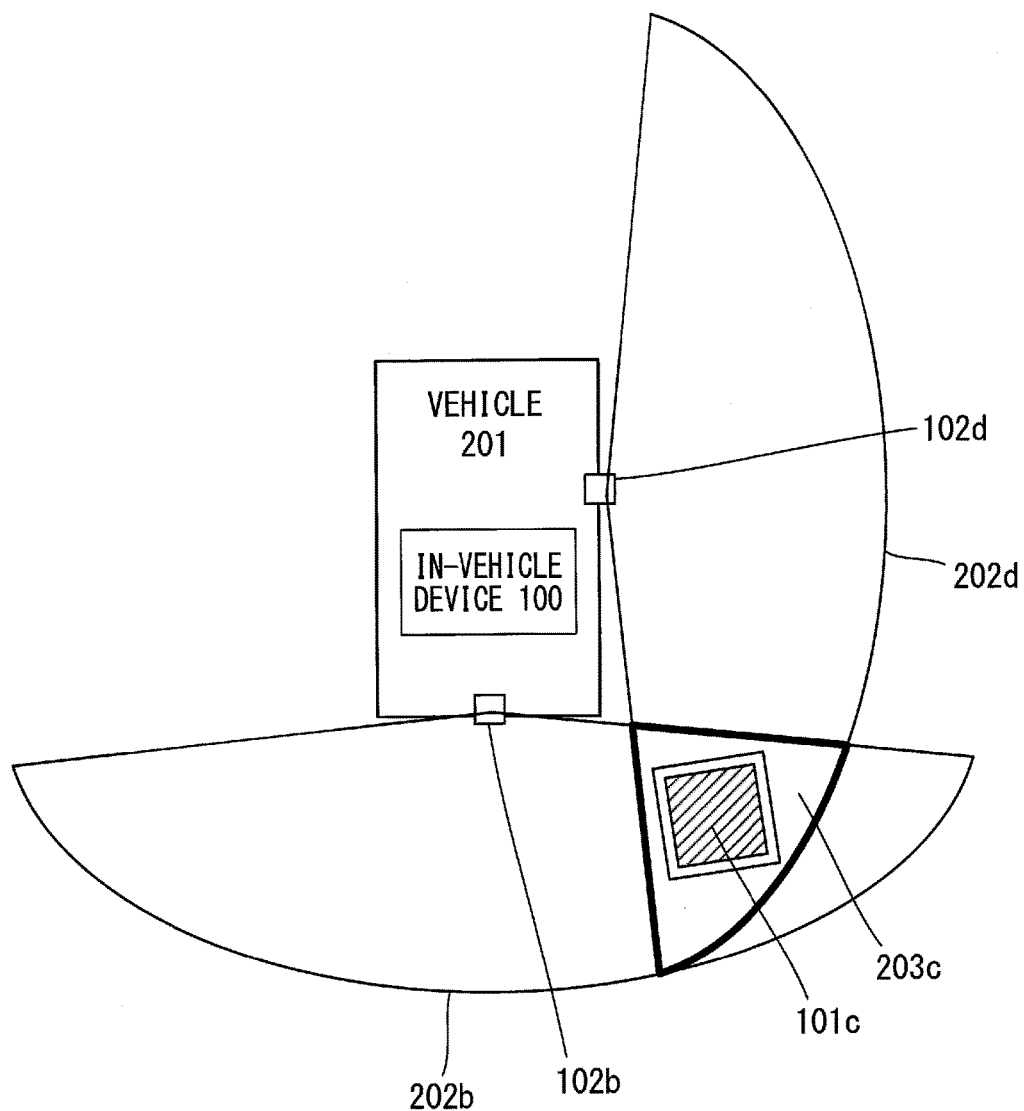
FIG. 15 A view showing one example of an environment in which calibration of cameras is performed using a camera calibration device according to the second embodiment of the present invention.

A second embodiment of the present invention will be described. FIG. 15 is one example of an environment in which calibration of cameras is performed with a camera calibration device according to a second embodiment of the present invention. In FIG. 15, a vehicle 201 is a large-scale vehicle such as a large-scale dump truck, mining machine, or the like. FIG. 15 shows a state where the vehicle 201 is assembled in the delivery destination and a camera 102b and a camera 102d are installed in the rear part and right side part of the vehicle 201, respectively.

Figure 16:
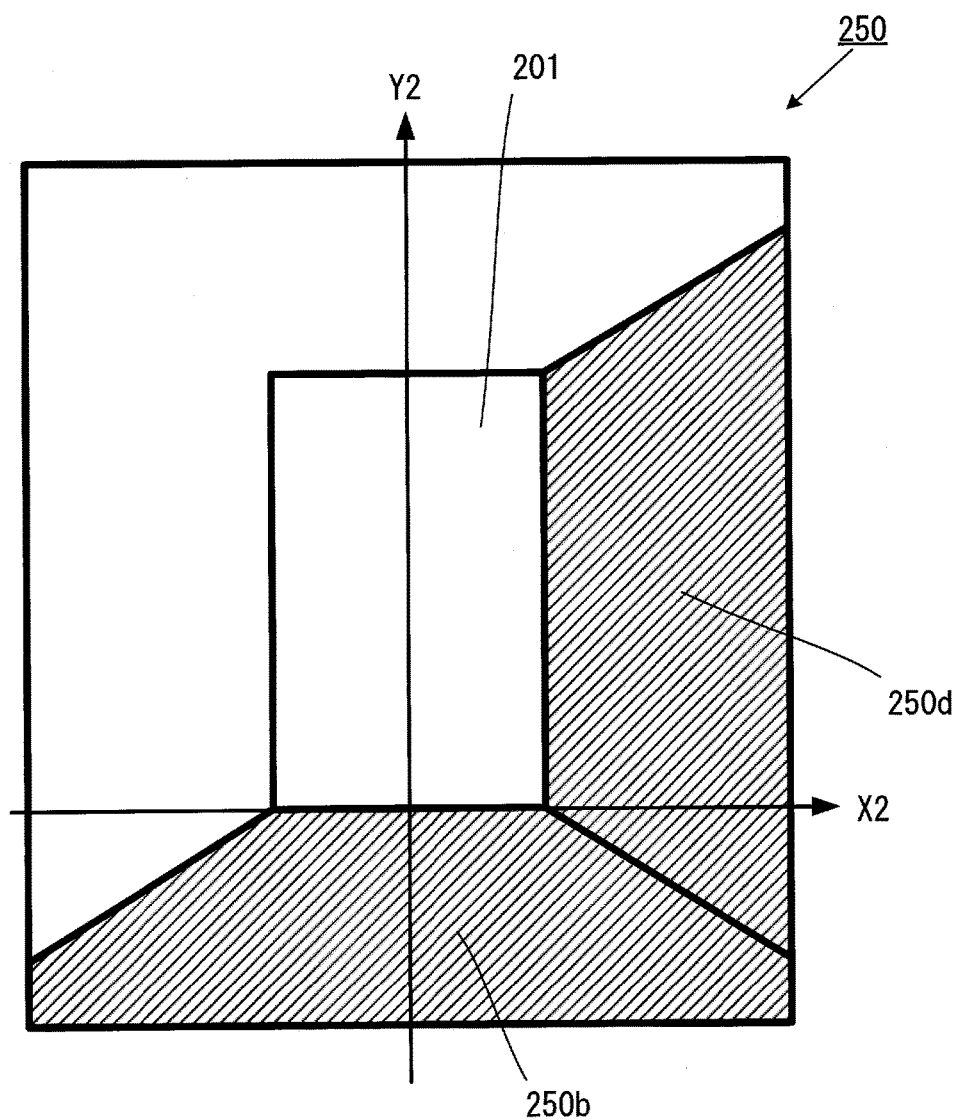
FIG. 16 A view showing one example of an overhead view image that is synthesized with a high accuracy owing to the calibration by the camera calibration device according to the second embodiment of the present invention.

An in-vehicle device 100 provides information about the surrounding environment that is a blind spot of the driver, by generating an overhead view image as shown in FIG. 16 and displaying the image on the display unit provided in the driver seat. The serviceman calibrates installation states of the camera 102b and the camera 102d in the delivery destination of the vehicle 201, in order to set the in-vehicle device 100 so that the overhead view image is correctly generated.

The in-vehicle device 100 is provided in the vehicle 201 and connected to the camera 102b and the camera 102d. The camera 102b outputs a captured image B1 of an imaging range 202b to the in-vehicle device 100. The camera 102d outputs a captured image D1 of an imaging range 202d to the in-vehicle device 100. The overhead view image shown in FIG. 16 includes an image region 250b generated on the basis of the captured image B1 output by the camera 102b, and an image region 250d generated on the basis of the captured image D1 output by the camera 102d.

The serviceman installs a calibration marker 101c on the right rear side of the vehicle 201. In order to successfully perform the calibration of the installation states of the camera 102b and the camera 102d, it is necessary that the calibration marker 101c is installed in a common imaging range 203c in which the imaging range 202b of the camera 102b and an imaging range 202b of the camera 102d overlap each other, as in FIG. 15.

The configuration of the in-vehicle device 100 in the second embodiment is identical to that in the first embodiment. In other words, the in-vehicle device 100 in the second embodiment includes an image acquiring unit 103, an input unit 104, an image correctness determining unit 105, a calibration unit 106, a calibration correctness determining unit 107, a state analyzing unit 108, a display unit 109, and an overhead view image generating unit 110. In the in-vehicle device 100 in the second embodiment, the process of the calibration unit 106 is different from that in the first embodiment.

Figure 17:
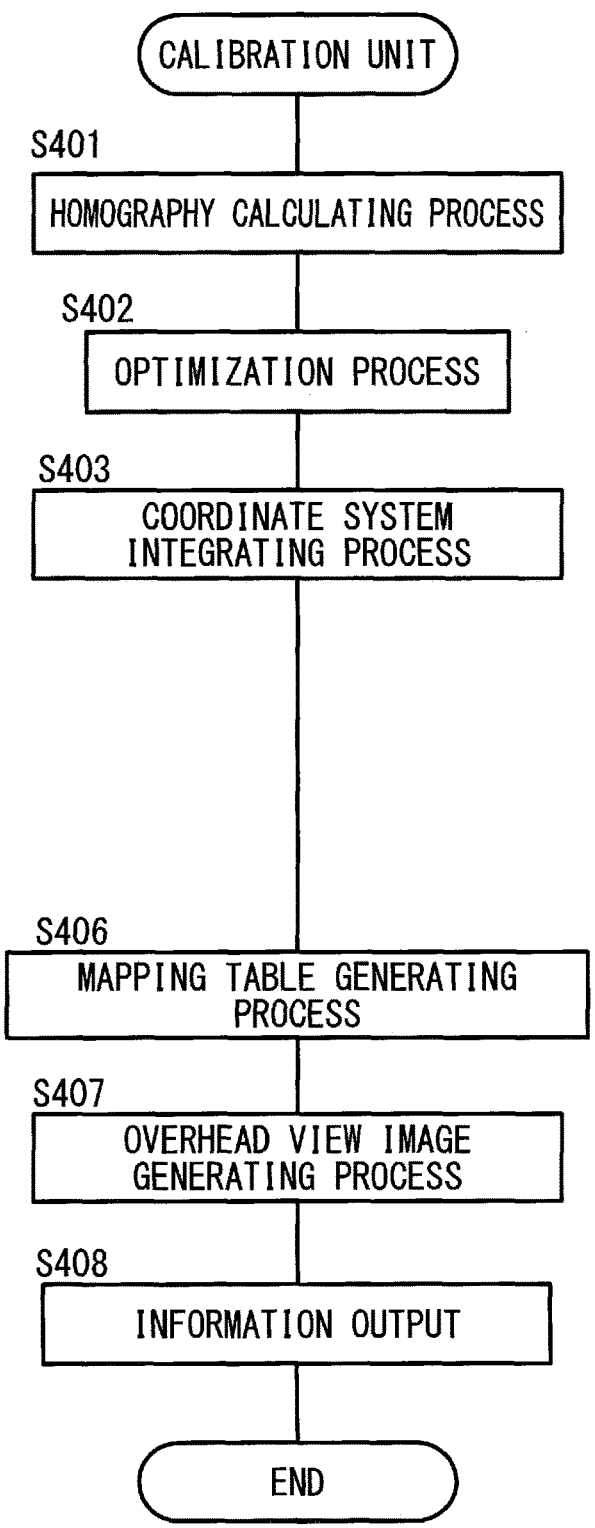
FIG. 17 A flowchart for the calibration unit of the camera calibration device according to the second embodiment of the present invention.

FIG. 17 is a flowchart for the calibration unit 106 in the second embodiment of the present invention. As apparent from a comparison between FIG. 17 and FIG. 12, the calibration unit 106 in the second embodiment is different from the calibration unit 106 in the first embodiment in that the error distribution process of step S404 and the parameter correction process of step S405 are not executed.

According to the embodiments described above, the following operational advantages can be achieved.

(1) Reference is made to FIGS. 15-17 which represent the second embodiment and FIGS. 3, 4, and 6 which represent the first embodiment. The camera calibration device 100 captures images of at least one marker 101c with at least two cameras 102b, 102d and calibrates the installation states of the at least two cameras 102b, 102d, on the basis of the captured images of the at least two cameras 102b, 102d. The calibration device 100 includes an extracting unit, e.g. an image correctness determining unit 105, that extracts feature amounts of the at least one marker 101c on the basis of the captured images of the at least two cameras 102b, 102d; a primary calibration unit 160a that calculates a position of each of the at least two cameras 102 in a marker coordinate system, on the basis of the feature amounts; and a secondary calibration unit 160b that preforms coordinate transformation of the positions of the cameras in the marker coordinate system calculated by the primary calibration unit 160a, into positions of the cameras 102 in a vehicle coordinate system. Because the overhead view image can be generated on the basis of at least two photographed images without physically adjusting the installation states of the at least two cameras 102b, 102d that photograph the captured images for overhead view image synthesis, calibration can be performed with a high accuracy after shipment of a vehicle, in a garage of a, dealer, in a parking area of an user, or in a field in the delivery destination where a large-scale vehicle is assembled, for example. Of course, the same effect can be obtained also by using the calibration device according to the present invention in the final adjusting step in a factory where vehicles are assembled.

(2) The camera calibration device 100 in the second embodiment is a camera calibration device for the cameras 102b and 102d, wherein in captured images from the two cameras 102b and 102d, an image of one marker 101c is included in a range where the imaging ranges of the two cameras 102b and 102d overlap each other. The extracting unit, e.g. the image correctness determining unit 105 extracts feature point coordinates of one marker 101c. The primary calibration unit 160a calculates a homography matrix for coordinate transformation of the feature point coordinates into the marker coordinate system and calculates positions of the two cameras 102b and 102d in the marker coordinate system on the basis of the homography matrix. The secondary calibration unit 160 has a coordinate system integrating unit 163 that performs coordinate transformation of the positions of the cameras 102b and 102d in the marker coordinate system calculated by the primary calibration unit 160a into positions in the vehicle coordinate system. Because the overhead view image can be generated on the basis of two captured images without physically adjusting the installation states of the two cameras 102b, 102d that photograph the captured images for overhead view image synthesis, calibration can be performed with a high accuracy after shipment of a vehicle, in a field in a delivery destination where a large-scale vehicle is assembled, for example.

(3) The camera calibration device in the first embodiment is a calibration device for four cameras 102a-102d. Each of the four cameras 102a-102d has an imaging range that overlaps imaging ranges of other two cameras among the four cameras 102a-102d. In each of the captured images from the four cameras 102a-102d, an image of one marker is included in a range where the imaging ranges of the four cameras 102a-102d overlap each other. The extracting unit, e.g. the image correctness determining unit 105 extracts feature point coordinates of each of four markers 101a-101d. For each of the four markers 101a-101d, the primary calibration unit 160 calculates a homography matrix for coordinate transformation of the feature point coordinates of the respective marker into the marker coordinate system of the respective marker for each camera 102a-102d that includes the respective marker in its imaging range, and calculates the position of the respective camera in the marker coordinate system after the transformation with the homography matrix, on the basis of the homography matrix. Therefore, because the overhead view image can be generated on the basis of four captured images without physically adjusting the installation states of the four cameras 102b, 102d that photograph the captured images for overhead view image synthesis, the calibration can be performed with a high accuracy after shipment of a vehicle, in a garage of a, dealer or in a parking area of an user, for example.

The embodiments described above can be modified and practiced in the following ways.

(Variation 1) The image correctness determining unit 105 may determine whether the brightness of the captured images A1-D1 is correct or not before the corrected image generating unit 151 generates the corrected images A2-D2 and if not, may correct the brightness of the captured images A1-D1 with image processing. With such a correction, frequency of calibration failures due to the causes 1, 2, 6, and 7 can be reduced.

(Variation 2) When the serviceman specifies the positions of the feature points in response to the process of the feature point input requiring unit 155, the feature point coordinates calculated by the feature point input requiring unit 155 may deviate from true feature point coordinates due to input error. With the following process, the deviation of the feature point coordinates calculated by the feature point input requiring unit 155 may be corrected. The in-vehicle device 100 extends the corrected image of the surroundings of the calibration marker 101 whose feature points are specified by the serviceman, in order to generate an extended corrected image, with image processing such as linear extension method. In the extended corrected image, the brightness signal changes not sharply in the vicinity of the true feature point, but gently in a slope form. Then, the in-vehicle device 100 connects center parts of the slopes to detect two lines that intersect in the vicinity of the feature point and calculates an intersection point of the two lines as a true feature point coordinate. With such a correction, frequency of calibration failures due to the causes 4 and 9 can be reduced.

(Variation 3) Although the task content generating unit 184 of the state analyzing unit 108 has determined the cause of the failure of the calibration among the causes 1 to 13, causes which may be determined by the task content generating unit 184 are not limited to the causes 1 to 13. For example, the task content generating unit 184 may determine that the calibration is failed because the calibration markers 101a-101d are not installed on the flat ground.

(Variation 4) Although the figures drawn on the surfaces of the calibration markers 101a-101d are rectangles that are filled with solid black color in the embodiments described above, they may be other figures. For example, a checkered pattern may be applied. In addition, although in the embodiments described above, the feature point $P_{(a,\ 1)}$ is an origin of the marker coordinate system, other feature point may be the origin and may be selected for each figure drawn on the surface of the calibration markers 101a-101d, as appropriate.

(Variation 5) Methods for aligning the references of the installation positions and the installation angles of the cameras 102a-102d to the vehicle coordinate system by the coordinate system integrating unit 163 are not limited to only the methods described above. For example, the installation position and the installation angle of the camera 102c in the marker coordinate system of the calibration marker 101a may be calculated in the following way, respectively.

[1] The coordinate system integrating unit 163 subtracts the installation position and the installation angle of (2. 5) from the installation position and the installation angle of (2. 2), respectively. In this way, the installation position and the installation angle of the camera 102c with respect to the camera 102a in the marker coordinate system of the calibration marker 101b can be calculated, respectively.

[2] The coordinate system integrating unit 163 subtracts the calculation results of [1] from the installation position and the installation angle of (2. 1), respectively.

(Variation 6) Specific sequence of the primary calibration unit 160a and the secondary calibration unit 160b may be different from the sequences presented in the embodiments described above. For example, the primary calibration unit 160a may employ an approach without using a homography matrix and calculate the installation positions and the installation angles of a plurality of cameras in the marker coordinate system, on the basis of feature point coordinates of the calibration markers in the corrected image coordinate system.

(Variation 7) The camera calibration device in the embodiments described above is the in-vehicle device 100 that is mounted on the vehicle 201 and has the overhead view image generating unit 110. However, the camera calibration device according to the present invention may not be an in-vehicle device mounted on the vehicle 201, but may be an external information terminal that can be connected to the in-vehicle device having the overhead view image generating unit 110. For example, the camera calibration device may be a notebook personal computer that the serviceman carries.

The embodiments and variations described above are merely exemplary and the present invention is not limited to their contents, unless impairing the features of the invention. Furthermore, the embodiments and variations described above may be combined and performed unless impairing the features of the invention.

The disclosure of the following priority application is herein incorporated by reference:

Japanese Patent Application 2013-247261 (filed Nov. 29, 2013)

REFERENCE SIGNS LIST

100 in-vehicle device
101a, 101b, 101c, 101d calibration markers
102a, 102b, 102c, 102d camera
105 image correctness determining unit
106 calibration unit
107 calibration correctness determining unit
108 state analyzing unit
151 corrected image generating unit
152 calibration marker recognizing unit
153 feature point coordinate calculating unit
154 image determining unit
155 feature point input requiring unit
160a primary calibration unit
160b secondary calibration unit
161 homography matrix calculating unit
162 optimization processing unit
163 coordinate system integrating unit
164 error distributing unit
165 parameter correcting unit
166 mapping table updating unit
201 vehicle

The invention claimed is:

1. A camera calibration device that captures images of at least one marker with at least two cameras and calibrates installation states of the at least two cameras based upon the captured images by the at least two cameras, comprising:
   at least one processor for executing stored instructions to:
   extract a feature amount of the at least one marker based upon the captured images by the at least two cameras;
   calculate a position of each of the at least two cameras in a marker coordinate system, based upon the feature amount;
   perform coordinate transformation of the calculated position of each of the cameras in the marker coordinate system, into a position of each of the cameras in a vehicle coordinate system;
   determine whether the images are correctly photographed or not, based upon the feature amount;
   determine whether the position of each of the plurality of cameras in the vehicle coordinate system is correct or not, based upon an overhead view image that is generated after the performed coordinate transformation; and analyze a cause of failure of calibration, based upon the determination of whether the images are correctly photographed or not and the determination of whether the position of each of the plurality of cameras in the vehicle coordinate system is correct or not.

2. The camera calibration device according to claim 1, wherein:
the at least two cameras are two cameras whose imaging ranges overlap each other;
in the captured images from the two cameras, an image of one marker is included in a range where the imaging ranges of the two cameras overlap each other;
the at least one processor extracts a position of a feature point of the one marker as the feature amount;
the at least one processor calculates a homography matrix for coordinate transformation of the position of the feature point into the marker coordinate system and calculates positions of the two cameras in the marker coordinate system based upon the homography matrix; and
at least one processor transforms the calculated positions of the cameras in the marker coordinate system into positions in the vehicle coordinate system.

3. The camera calibration device according to claim 2, wherein:
the camera calibration device is for the two cameras and two additional two cameras;
each of four cameras has an imaging range that overlaps imaging ranges of other two cameras among the four cameras;
in each of captured images from the four cameras, an image of one marker is included in a range where the imaging ranges of the four cameras overlap each other;
the at least one processor extracts a position of a feature point of each of four markers as the feature amount; and
for each of the four markers, the at least one processor calculates a homography matrix for coordinate transformation of a position of a feature point of a corresponding marker into the marker coordinate system of the corresponding marker, for each camera that includes the corresponding marker in its imaging range, and calculates a position of a corresponding camera in the marker coordinate system after transformation with the homography matrix, based upon the homography matrix.

4. The camera calibration device according to claim 3, wherein:
the four cameras are a first, a second, a third, and a fourth cameras;
the first camera has an imaging range that overlaps imaging ranges of the third and fourth cameras;
the second camera has an imaging range that overlaps imaging ranges of the third and fourth cameras;
an image of a first marker is included in a range where the imaging range of the first camera and an imaging range of the fourth camera overlap each other;
an image of a second marker is included in a range where the imaging range of the first camera and an imaging range of the third camera overlap each other;
an image of a third marker is included in a range where the imaging range of the second camera and the imaging range of the fourth camera overlap each other;
an image of a fourth marker is included in a range where the imaging range of the second camera and the imaging range of the third camera overlap each other;
the vehicle coordinate system is a coordinate system setting an installation position of the first camera as a reference; and
the at least one processor:
calculates positions of the four cameras in the marker coordinate system of the first marker based upon calculated positions for a plurality of cameras whose imaging ranges overlap each other, among the four cameras, and
transforms the positions of the four cameras in the marker coordinate system of the first marker into the vehicle coordinate system, based upon the position of the first camera in the marker coordinate system of the first marker.

5. The camera calibration device according to claim 4, wherein:
the at least one processor calculates:
a position of the first camera and a position of the fourth camera in the marker coordinate system of the first marker,
a position of the third camera and a position of the first camera in the marker coordinate system of the second marker,
a position of the fourth camera and a position of the second camera in the marker coordinate system of the third marker, and
a position of the second camera and a position of the third camera in the marker coordinate system of the fourth marker; and
the at least one processor:
calculates a relative positional relationship between different two marker coordinate systems based upon a position of the same camera in the two marker coordinate systems,
calculates relative positional relationships of the marker coordinate systems of the second, third, and fourth markers in the marker coordinate system of the first marker, based upon the relative positional relationship between the different two marker coordinate systems, and
calculates a position of each of the cameras in the marker coordinate system of the first marker, based upon the relative positional relationships of the marker coordinate systems of the second, third, and fourth markers in the marker coordinate system of the first marker and the calculated position of each of the cameras.

6. The camera calibration device according to claim 5, wherein:
the at least one processor calculates the position of the first camera in the marker coordinate system of the first marker, based upon the position of the second marker in the marker coordinate system of the first marker and the position of the first camera in the marker coordinate system of the second marker; and
the at least one processor further distributes an error between the calculated position of the first camera in the marker coordinate system of the first marker and the calculated position of the first camera in the marker coordinate system of the first marker, to the position of each of the cameras in the marker coordinate system of the first marker.

7. The camera calibration device according to claim 6, wherein:
the at least one processor further corrects the position of each of the cameras in the vehicle coordinate system based upon (1) a barycenter position of a position in the vehicle coordinate system into which the position of the feature point of the first marker in each of captured images of the first and fourth cameras is transformed, (2) a barycenter position of a position in the vehicle coordinate system into which the position of the feature point of the second marker in each of captured images of the third and first cameras is transformed, (3) a barycenter position of a position in the vehicle coordinate system into which the position of the feature point of the third marker in each of captured images of the fourth and second cameras is transformed, and (4) a barycenter position of a position in the vehicle coordinate system into which transformation of the position of the feature point of the fourth marker in each of captured images of the second and third cameras is transformed, after the error is distributed.

8. The camera calibration device according to claim 1, wherein:
the at least one processor:
determines whether an accuracy in the feature amount after calibration is correct or not,
analyzes a state of the calibration, if the determined feature amount is correct in accuracy, and
analyzes the captured images, if the determined feature amount is incorrect in accuracy.

9. The camera calibration device according to claim 8,
wherein the at least one processor receives input of information about dimensions of the at least one marker, and
wherein the at least one processor determines the accuracy in the feature amount, based upon a local minimum value of an objective function representing a sum of respective errors between the calculated positions of the at least two cameras in the marker coordinate system and theoretical positions of the at least two cameras in the marker coordinate system based upon information about the dimensions of the at least one marker.

10. The camera calibration device according to claim 1, wherein:
the at least one processor displays the determination results on a display.

* * * * *